(12) United States Patent
King

(10) Patent No.: US 10,150,398 B2
(45) Date of Patent: Dec. 11, 2018

(54) DEVICES, SYSTEMS, AND METHODS RELATED TO EXTRACTING INFILL FROM ARTIFICIAL TURF

(71) Applicant: John M. King, Mt. Airy, MD (US)

(72) Inventor: John M. King, Mt. Airy, MD (US)

( * ) Notice: Subject to any disclaimer, the term of this patent is extended or adjusted under 35 U.S.C. 154(b) by 0 days.

(21) Appl. No.: 15/430,820

(22) Filed: Feb. 13, 2017

(65) Prior Publication Data
US 2017/0232878 A1   Aug. 17, 2017

Related U.S. Application Data

(60) Provisional application No. 62/295,184, filed on Feb. 15, 2016, provisional application No. 62/338,057, filed on May 18, 2016, provisional application No. 62/384,254, filed on Sep. 7, 2016.

(51) Int. Cl.
*E01C 23/00* (2006.01)
*B60P 1/00* (2006.01)
*E01C 23/12* (2006.01)

(52) U.S. Cl.
CPC ............... *B60P 1/00* (2013.01); *E01C 23/00* (2013.01); *E01C 23/121* (2013.01)

(58) Field of Classification Search
CPC ..................................................... E01C 23/00
USPC ........................................................ 414/502
See application file for complete search history.

(56) References Cited

U.S. PATENT DOCUMENTS

| | | | |
|---|---|---|---|
| 2,628,413 A | 2/1953 | Hallenbeck | |
| 3,896,612 A | 7/1975 | McHugh et al. | |
| 4,015,666 A | 4/1977 | Brouwer et al. | |
| 4,607,837 A * | 8/1986 | Pierce | B65H 5/025 198/836.2 |
| 5,203,665 A * | 4/1993 | Lande | B02C 18/0076 100/1 |
| 6,056,064 A | 5/2000 | Devries | |
| 6,827,151 B1 * | 12/2004 | Winslow | A01B 45/00 172/32 |
| 7,644,816 B2 | 1/2010 | Veiga Leal et al. | |
| 8,215,577 B2 | 7/2012 | Gordon et al. | |
| 8,464,801 B2 * | 6/2013 | Bearden | A01B 45/045 172/20 |
| 8,562,249 B2 | 10/2013 | Owegeser | |
| 8,771,434 B2 * | 7/2014 | Mitchell | E01C 13/08 134/122 R |
| 8,974,311 B2 | 3/2015 | Motz et al. | |
| 9,010,450 B2 | 4/2015 | Motz et al. | |

(Continued)

*Primary Examiner* — Jonathan Snelting
(74) *Attorney, Agent, or Firm* — Leveque IP Law, P.C.

(57) ABSTRACT

A machine for extracting infill from artificial turf includes a first conveyor forming an inclined surface having movable tracks to engage and move a length of artificial turf from a first end to a second end of the machine. A rake disposed on the first end of the machine may include teeth configured to engage an underside of the turf for feeding onto the first conveyer. The machine may also include a first roller disposed above the first conveyor, where the first roller is movable to apply a downward force to a top surface of the first conveyor. The machine may further include a second roller on the second end of the machine, where the second roller includes protrusions that agitate the turf for assisting in removing infill. The machine may also include a second conveyor to receive infill removed from the turf for discharge from the machine.

22 Claims, 21 Drawing Sheets

(56) References Cited

U.S. PATENT DOCUMENTS

| | | |
|---|---|---|
| 9,027,662 B2 | 5/2015 | Motz et al. |
| 9,422,129 B2 | 8/2016 | Motz et al. |
| 9,491,897 B2 | 11/2016 | Owegeser |
| 2005/0189124 A1 | 9/2005 | Wanner |
| 2014/0291433 A1 | 10/2014 | Owegeser |
| 2014/0305669 A1 | 10/2014 | Owegeser |
| 2015/0033626 A1 | 2/2015 | Sutherland et al. |

* cited by examiner

DEVICES, SYSTEMS, AND METHODS RELATED TO EXTRACTING INFILL FROM ARTIFICIAL TURF

CROSS-REFERENCE TO RELATED APPLICATIONS

This application claims the benefit under 35 U.S.C. § 119(e) of U.S. Provisional Patent Application No. 62/295,184 filed on Feb. 15, 2016, U.S. Provisional Patent Application No. 62/338,057 filed on May 18, 2016, and U.S. Provisional Patent Application No. 62/384,254 filed on Sep. 7, 2016, where the entire content of each of the foregoing applications is hereby incorporated by reference.

BACKGROUND

There remains a need for improved devices, systems, and methods related to extracting infill from an artificial turf field, e.g., for reuse or recycling.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals identify corresponding elements.

DETAILED DESCRIPTION

Figure 1:
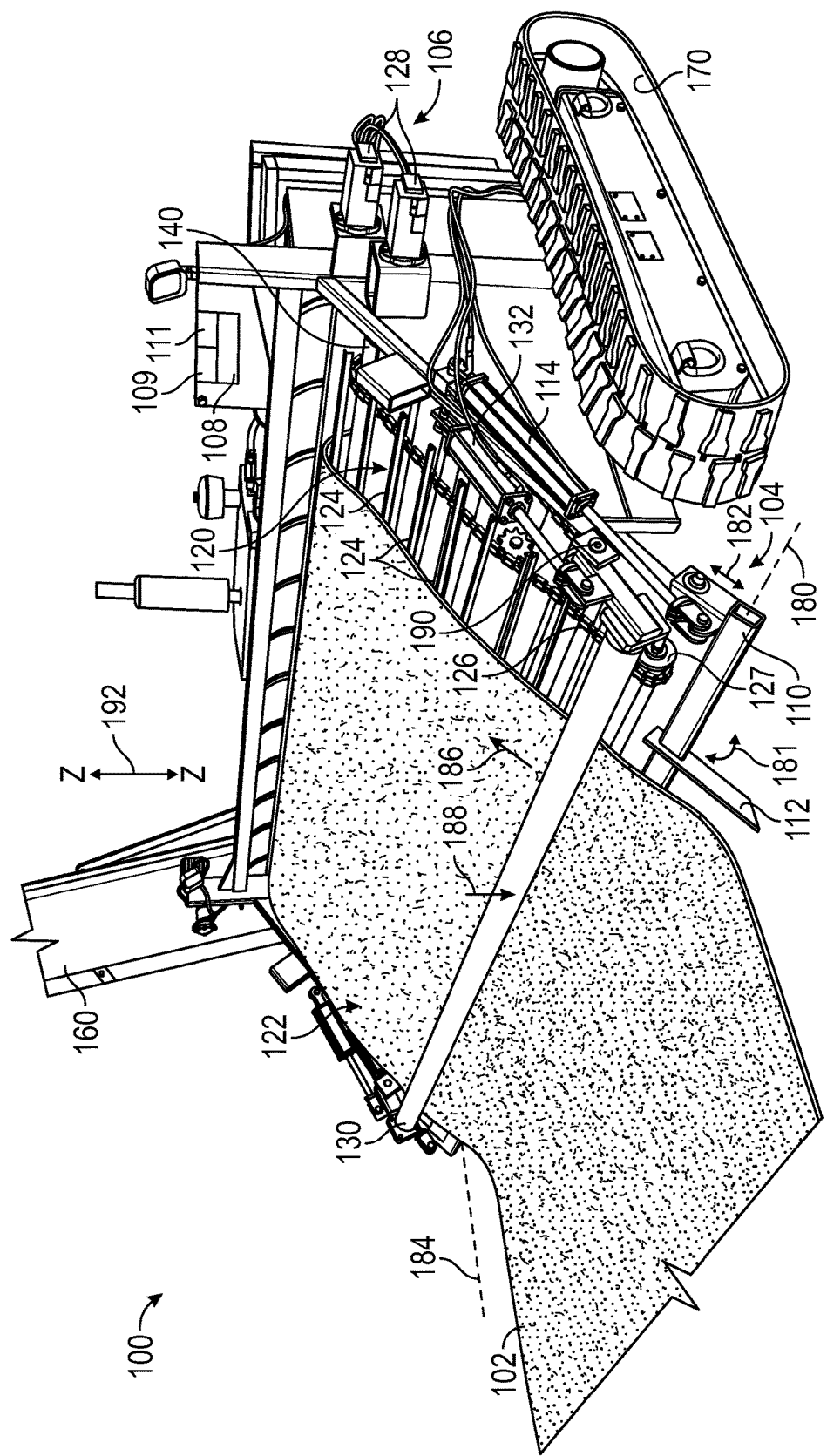
FIG. 1 illustrates a perspective view of a machine for extracting infill from artificial turf, in accordance with a representative embodiment.

The various methods, systems, apparatus, and devices described herein generally provide for infill extraction from artificial turf, and/or methods, systems, apparatus, and devices related thereto.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B, or C" means "any of the following: A; B; C; A and B; A and C; B and C; A, B, and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms.

In general, the devices, systems, and methods described herein may be configured for use with artificial turf, and more specifically the devices, systems, and methods described herein may be configured for tasks related to the removal, recycling, and reuse of artificial turf and its infill for playing fields and the like.

As used herein, "artificial turf" may generally include a surface of synthetic fibers made to look like natural grass. Artificial turf may be utilized in playing fields and the like, e.g., fields and surfaces for sports or games originally intended to be played on grass or that are or typically played on grass, including without limitation football fields (American and otherwise), soccer fields or pitches, baseball fields, softball fields, field hockey fields, lacrosse fields, golf courses, rugby fields, polo fields, cricket fields, croquet courts, tennis courts, badminton courts, lawn game fields, track and field areas, and the like. Similarly, artificial turf may also or instead be used on practice surfaces for sports and games, in parks, in playgrounds, in recreational areas, and the like. Artificial turf may also or instead be utilized in non-sport or non-game related applications including without limitation in landscaping, in airports, and the like.

In general, artificial turf may include a base, fibers that emulate natural grass extending from the base, and infill.

The base may include a polypropylene material or the like to which the fibers are attached. The base may include one or more base layers, for example a backing layer with weep holes or the like for connecting to the fibers, an energy pad or shock pad, and a leveling layer. In some instances, one or more of the energy pad or elastic layer, a leveling layer, or a drainage layer are separate from the artificial turf. Devices, systems, and techniques described herein may provide for cutting or removing the artificial turf without damaging any padding or layers disposed beneath the artificial turf.

The fibers (sometimes referred to as "blades") may include one or more of straight fibers, curly fibers, bent fibers, fibers with one or more loops, or any combination thereof. The fibers may be made from one or more of polyethylene, polypropylene, nylon, other polymers, plant-derived cellulose, and the like. The fibers may be manufactured such that they form a pile on the base, where the pile can generally be manufactured to various lengths depending on a use of the artificial turf. Thus, the typical fiber length and system characteristics may be determined by the specific activity requirements of the artificial turf.

The infill may include a granular filler, e.g., where the granular filler aids in the artificial turf resembling natural turf. To this end, the synthetic fibers blades may be interspersed with infill—a top soil created with one or more of sand, granules of rubber (e.g., recycled rubber), or other infill materials that can provide a desired stability, uniformity, and resiliency for the artificial turf. In an implementation, it is intended that each fiber stands above the infill material.

When infill comprises granulated rubber, sometimes referred to as "crumb rubber," it is often made from recycled tires, e.g., car tires and truck tires. The infill may include one or more of ambient and cryogenic rubber. The infill may also or instead include without limitation one or more of coated rubber, ethylene propylene diene monomer (EPDM), organic material, silica, coated silica, thermoplastic elastomers (TPE), and the like.

The infill may be placed on an artificial turf field in predetermined quantities. In some implementations, about nine pounds of infill is used for about every square foot of artificial turf. More or less infill may also or instead be used, where such quantities may be dependent on a use of the artificial turf. When the infill is removed from the artificial turf (e.g., when the infill requires replacement or otherwise), the infill may be recycled, e.g., for asphalt products and the like. Because of the amount of infill present in artificial turf fields, and the weight and mass associated therewith, it may be desirous to remove the infill when removing an artificial turf field, replacing an artificial turf field, performing maintenance on an artificial turf field, demolishing an artificial turf field, and performing other tasks associated with the artificial turf field or the infill itself.

Implementations may include devices, systems, and methods for performing one or more of the following functions, which are provided by way of example and not of limitation: cutting an artificial turf field into strips to facilitate its removal, removing infill from strips of artificial turf, configuring strips of artificial turf for transport (i.e., collecting strips of artificial turf), repairing artificial turf and grooming repaired sections of artificial turf, and the like.

Cutting an artificial turf field into strips may facilitate its removal, e.g., from a field or from its base layers. Cutting an artificial turf field may be advantageously performed in a manner such that the artificial turf can be removed from any padding or other layers disposed beneath the artificial turf without causing any damage to (or minimizing damage to) any such layers. Cutting an artificial turf field into strips to facilitate its removal may also or instead include cutting the artificial turf in a manner that can facilitate its reuse. This may include cutting the turf into strips or lengths that include substantially straight edges for attaching to other strips of artificial turf when reusing the artificial turf. This may also or instead include cutting the artificial turf into strips having a predetermined width selected for reuse. The predetermined width may include a maximum width for one or more of infill removal, configuring the artificial turf for transport, transporting the artificial turf, applying the artificial turf for reuse, and the like. In an implementation, a maximum width is preferred because this maximum width translates into less seams (or joints) to be joined together when reassembling an artificial turf field. In other words, maximizing the width of strips of artificial turf may minimize the number of seams in a field. In an implementation, it is desirous for strips of artificial turf to have a width of about 12 feet, which minimizes seams when reassembling the artificial turf while still allowing the 12-foot-wide strips to be configured for transport. Other sizes of the strips of artificial turf are also or instead possible.

Removing infill from artificial turf may be used for recycling or reuse of the infill, or to lighten the weight and reduce the mass of the artificial turf, e.g., for transport. For example, where the infill includes granulated rubber, it may be desirous to collect the rubber from an artificial turf field for recycling. Implementations described herein may provide for the removal of infill from strips of artificial turf for collection of the infill for reuse or recycling, where removal of the infill does not substantially damage the artificial turf such that the artificial turf can be reused. In an implementation, after cutting the artificial turf into strips, the infill is removed; once the infill is removed, the artificial turf is collected and configured for transport; and once configured for transport, the artificial turf is transported for reuse or otherwise.

As used herein, unless stated to the contrary, "removing infill from artificial turf," "extracting infill from artificial turf," and the like may include completely removing infill, removing a majority of infill, removing a predetermined percentage of infill, partially removing infill, and so on.

Infill that is removed from artificial turf may be placed into containers. The containers may include without limitation one or more of bags, sacks, bins, truck beds (e.g., dumping beds of dump trucks), boxes, shipping containers, and the like. For example, infill may be removed from artificial turf and directed into bags that hold approximately one ton of infill. The bags may be structurally configured for use with one or more machines for removing infill such as those described herein, where the bags are also or instead structurally configured for ease of transport. For example, the bags may have handles or the like for lifting, moving, dropping, or placing the bags in a desired location.

Configuring strips or lengths of artificial turf for transport may include collecting the artificial turf into a roll or the like for facilitating placement of the strips or lengths of artificial turf onto a truck bed or other vehicle for transport. To this end, configuring strips of artificial turf for transport may include rolling the strips of artificial turf into a bale or the like.

Repairing artificial turf may include grooming a repaired section of the artificial turf such that the repaired section is not visible, i.e., so that it substantially blends in with the remainder of an artificial turf field.

FIG. 1 illustrates a perspective view of a machine for extracting infill from artificial turf, in accordance with a representative embodiment. The machine 100 for extracting infill from artificial turf 102 may include a rake 110, a first conveyor 120, a first roller 130, a second roller 140, and a second conveyor (not shown in FIG. 1).

The rake 110 may be disposed on a first end 104 of the machine 100. The first end 104 of the machine 100 may be the front of the machine 100, where a length (i.e., a strip) of artificial turf 102 is loaded onto the front of the machine 100 for extracting infill from the artificial turf 102.

The rake 110 may include one or more teeth 112. One or more of the teeth 112 may be structurally configured to engage an underside of the length of artificial turf 102 for feeding the artificial turf 102 onto the first conveyor 120, e.g., one or more of the teeth 112 may include an inclined top surface for engaging an underside of the length of artificial turf 102 for feeding the artificial turf 102 onto the first conveyor 120. Thus, in an implementation, the rake 110 may lift the artificial turf 102 for feeding the artificial turf 102 onto the first conveyor 120, and more specifically onto tracks or feed chains included on the first conveyor 120. In an implementation, one or more of the teeth 112 of the rake 110 may be substantially tapered or wedge-shaped, where the rake 110 acts as a spatula or the like to lift the artificial turf 102 for feeding the artificial turf 102 onto the first conveyor 120.

The rake 110 may be engaged with a first positioner 114 included on the machine 100. The first positioner 114 may be controllable via a controller 108 to move the rake 110 into engagement with the underside of the length of artificial turf 102. The first positioner 114 may be controllable to adjust a tilt angle of the rake 110 relative to the first end 104 of the machine 100. In other words, the first positioner 114 may be structurally configured to rotate the rake 110 about a first axis 180, where the teeth 112 of the rake 110 correspondingly move in the direction of the first arrows 181. The first positioner 114 may also or instead be controllable to adjust a distance between the one or more teeth 112 and the first conveyor 120 (e.g., the first positioner 114 may extend the rake 110 out from the first end 104 of the machine 100 for engagement with the artificial turf 102, i.e., substantially perpendicular to the first axis 180 in a direction of the second arrows 182). In implementations, the first positioner 114 may be structurally configured to move the entire structure of the rake 110, e.g., in the direction of the first arrows 181 or in the direction of the second arrows 182. In other implementations, the first positioner 114 may be structurally configured to move one or more teeth 112 of the rake 110, e.g., in the direction of the first arrows 181 or in the direction of the second arrows 182, independent from the structure of the rake 110. The first positioner 114 may include without limitation one or more of an actuator (e.g., a hydraulic actuator such as a hydraulic piston/cylinder), a motor, a pulley, a conveyor, a gear, a belt, a chain, and the like.

The first conveyor 120 may form an inclined surface 122 between the first end 104 of the machine 100 and a second end 106 of the machine 100. The inclined surface 122 may include an angle of about 30 degrees relative to a surface upon which the machine 100 is disposed or a horizontal axis 184 disposed through the machine 100. The first conveyor 120 may include one or more tracks 124 that are movable along the inclined surface 122 from the first end 104 of the machine 100 to the second end 106 of the machine 100. The tracks 124 may each be structurally configured to engage the artificial turf 102 and to move the artificial turf 102 from the first end 104 of the machine 100 to the second end 106 of the machine 100, i.e., in the direction shown by the third arrow 186. In an implementation, the one or more tracks 124 of the first conveyor 120 are disposed on one or more chains 126, where rotation of the one or more chains 126 by a drive gear 127 causes movement of the one or more tracks 124, e.g., from the first end 104 of the machine 100 to the second end 106 of the machine 100 on the top of the inclined surface 122 of the first conveyor 120. In implementations, the first conveyor 120 forms a continuous track around one or more gears, where at least one of the gears is driven by a motor (such as the one or more motors 128 shown in the figure). The tracks 124 may also or instead be integral with a conveyor belt or the like, or formed on a top surface of a conveyor belt or the like.

The first roller 130 may in general be disposed above the first conveyor 120. The first roller 130 may be attached to the machine 100 such that it is movable to apply a downward force to a top surface (i.e., the inclined surface 122) of the first conveyor 120. This downward force, which may be directed as shown by the fourth arrow 188, may promote an engagement of the artificial turf 102 and the one or more tracks 124 when the artificial turf 102 is disposed between the first roller 130 and the first conveyor 120 as shown in the figure. In other words, the first roller 130 may apply a predetermined amount of force or pressure to the artificial turf 102 to assist in an engagement of the artificial turf 102 and the tracks 124 of the first conveyor 120. In this manner, the first roller 130 may be considered to be a counter-pressure roller. The first roller 130 may be freely rotatable, i.e., such that it rotates as the artificial turf 102 moves up the inclined surface 122 of the first conveyor 120 from the first end 104 of the machine 100 to the second end 106 of the machine 100. Rotation of the first roller 130 may also or instead be mechanically driven, e.g., provided by a motor and controlled by a controller 108. In an implementation, the first roller 130 is freely rotatable and the downward force applied by the first roller 130 to the top surface of the first conveyor 120 is provided by the weight of the first roller 130.

The first roller 130 may be engaged with a second positioner 132 included on the machine 100. The second positioner 132 may be controllable via the controller 108 (or a different controller) to move the first roller 130 relative to the first conveyor 120 for adjusting the force applied to the top surface of the first conveyor 120. In this manner, the first roller 130 may be pivotally attached to the machine 100 so that it can swing up and down relative to the inclined surface 122. This movement may be accomplished by pivoting the first roller 130 about a pivot point 190, e.g., using the second positioner 132. The second positioner 132 may also or instead be controllable to move the first roller 130 to disengage from the top surface of the first conveyor 120 when the length of artificial turf 102 remains engaged with the first conveyor 120 without the force being applied to the top surface of the first conveyor 120. The second positioner 132 may also or instead be controllable to move the first roller 130 along a length of the first conveyor 120 between the first end 104 of the machine 100 and the second end 106 of the machine 100, e.g., forward and backward along the inclined surface 122. In other words, the first roller 130 may assist, supplement, or replace the tracks 124 of the first conveyor 120.

The first roller 130 may provide certain advantages over systems of the prior art, which typically include a counter chain disposed above a conveyor. These advantages may include without limitation: simplifying the design of the machine 100, preventing jamming (e.g., of the artificial turf 102, the chain 126, or the tracks 124), stabilizing a position or orientation of the artificial turf 102, preventing the artificial turf 102 from forming folds or wrinkles, providing a predetermined pressure that is substantially consistent along an entire width or a substantial portion of the artificial turf 102, rolling freely without a mechanical drive (although, in an implementation, the first roller 130 may be rotatably driven as discussed above), and combinations thereof.

The second positioner 132 may include without limitation one or more of an actuator (e.g., a hydraulic actuator such as a hydraulic piston/cylinder), a motor, a pulley, a conveyor, a gear, a belt, a chain, and the like. In an implementation, the second positioner and the first positioner are the same component. The second positioner 132 and the first positioner 114 may instead be separate components as shown in the figure. The second positioner 132 and the first positioner 114 may be driven by the one or more motors 128—e.g., the second positioner 132 and the first positioner 114 may be driven by the same motor or different motors.

The second roller 140 may be disposed on the second end 106 of the machine 100. The second roller 140 may be structurally configured to rotatably engage with the length of artificial turf 102 being transported by the first conveyor 120. The second roller 140 may include one or more protrusions that agitate the artificial turf 102 for assisting in the removal of infill from the artificial turf 102. In other words, the second roller 140 may agitate the artificial turf 102, where the protrusions essentially "beat" against the artificial turf 102 (e.g., the underside of the artificial turf 102) thereby urging the infill to be removed from the artificial turf 102. In this manner, the second roller 140 may be considered to be a "beater roller."

The second roller 140 may be configured within the machine 100 such that gravity also or instead assists in the removal of the infill. For example, and as shown in the figure, the artificial turf 102 may be upended by the teeth 112 of the rake 110 and directed onto the first conveyor 120. The first roller 130 may then apply a force onto the top of the artificial turf 102 to promote an engagement of the artificial turf 102 and the tracks 124 of the first conveyor 120 for moving the artificial turf 102 from the first end 104 of the machine 100 to the second end 106 of the machine 100. When the artificial turf 102 reaches the second end 106 of the machine 100, the underside of the artificial turf 102 may engage with the second roller 140, where the second roller 140 rotates moving the artificial turf 102 over (and at least partially around) the second roller 140. As the second roller 140 rotates, the protrusions may agitate the artificial turf 102 urging the infill to be extracted from the artificial turf 102. Also, because the artificial turf 102 may be traversing at least partially around the second roller 140, the second roller 140 may be aligned in a manner such that gravitational force urges the infill to fall from the artificial turf 102 (e.g., the artificial turf 102 may be disposed substantially upside-down at some point about the second roller 140 or otherwise within the machine 100).

The second roller 140 may be rotatable independent of movement of the first conveyor 120, e.g., rotation of chains 126 included in the first conveyor 120. In this manner, the second roller 140 may rotate at a different rotational velocity than the first conveyor 120. In an implementation, the second roller 140 rotates substantially faster than the rotation of the tracks 124 of the first conveyor 120 in order to better facilitate agitation of the artificial turf 102 for infill extraction. For example, the second roller 140 may rotate at about twice the rotational speed of the tracks 124. Rotation of the second roller 140 may be provided by the controller 108 (or a different controller) and a motor (e.g., of the one or more motors 128 shown in the figure). The second roller 140 may also or instead be rotatable independent of movement of the first roller 130.

The second conveyor may be disposed near the second roller 140, e.g., the second conveyor may be disposed beneath the second roller 140 to receive infill removed from the artificial turf 102. The second conveyor may include a surface structurally configured to transport the infill for discharge from the machine 100, e.g., a movable surface or a surface that directs the infill using gravity.

The machine 100 may include additional rollers or the like that are configured to engage the artificial turf 102 in order to align the artificial turf 102 for depositing back onto a playing surface after the infill has been removed. In an implementation, the second roller 140 is configured to direct the length of artificial turf 102 for discharge from the machine 100, e.g., to the additional rollers or the like described above.

The machine 100 may further include a third conveyor 160. The third conveyor 160 may be disposed adjacent to or otherwise in communication with the second conveyor—e.g., in an implementation, the third conveyor 160 is an extension of the second conveyor or vice-versa. The third conveyor 160 may be disposed at an angle along a z-axis 192 relative to the second conveyor. The third conveyor 160 may include a surface structurally configured to transport the infill from a first height located at an interface with the second conveyor to a second height located above the first height along the z-axis, e.g., a movable surface for transporting the infill. The machine 100 may further include a chute engaged with the third conveyor 160 at the second height. The chute may be structurally configured for engagement with a container that receives infill extracted by the machine 100. The chute may also or instead be structurally configured for depositing infill into a vehicle, e.g., a dump truck or the like operating tandem to the machine 100.

The machine 100 and its components may be structurally configured to accommodate the removal of infill from strips of artificial turf 102 having a predetermined width, e.g., a width of about 12 feet. For example, in an implementation, a width of the first conveyor 120 is selected to accommodate engagement with strips of artificial turf 102 having a width of about 12 feet. In another implementation, the machine 100 as a whole includes a predetermined maximum width, e.g., a predetermined maximum width of about 12 feet. The machine 100 and its components may also or instead be structurally configured to accommodate strips of artificial turf 102 having widths ranging from about two feet to about 12 feet.

The machine 100 may enable an entire football-sized field (or similarly sized field) of artificial turf to have its infill removed in about 4-5 hours. The machine 100 may be capable of filling one container or bag (e.g., containing about two thousand pounds of infill) in a range of time substantially equal to about three seconds to about three minutes. The machine 100 may be operable to remove infill from artificial turf 102 in wet, dry, and damp conditions.

The machine 100 and its components may be structurally configured to apply a relatively low ground pressure to avoid damage to any base layer(s) on an artificial turf field.

As referenced above, the machine 100 may include one or more controllers 108. The one or more controllers 108 may be configured to control one or more of: movement of the one or more tracks 124 of the first conveyor 120, movement of the rake 110 or its teeth 112, movement of the first roller 130, rotation of the first roller 130, rotation of the second roller 140, movement of the second conveyor and its movable surface, movement of the third conveyor 160 and its movable surface, and movement of the chute. The one or more controllers 108 may include user-operated controls, such as those found on construction equipment known in the art. In an implementation, the one or more controllers 108 are included in a control station or the like for operation by a user. The control station may be a remote station or a control station included on, or physically connected to, the machine 100.

The one or more controllers 108 may be electrically coupled in a communicating relationship with any of the components of the machine 100 described herein. The one or more controllers 108 may include a processor 109 and a memory 111, e.g., for automatic control of the machine 100. For example, the one or more controllers 108 may include any combination of software and/or processing circuitry suitable for controlling the various components of the machine 100 (or any systems described herein) including without limitation processors, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like.

The machine 100 may include one or more wheels 170 for maneuvering the machine 100, and a motor for driving the one or more wheels 170. As shown in the figure, the one or more wheels 170 may include continuous tracks or the like.

The machine 100 may be part of a system for removing, recycling, and reusing artificial turf and its infill.

In an embodiment, the first end 104 of the machine 100 may include a cutter that cuts the artificial turf 102 into strips. The cutter may be disposed on, or otherwise engaged with, the rake 110. The cutter may also or instead assist, supplement, or replace the rake 110.

Figure 2:
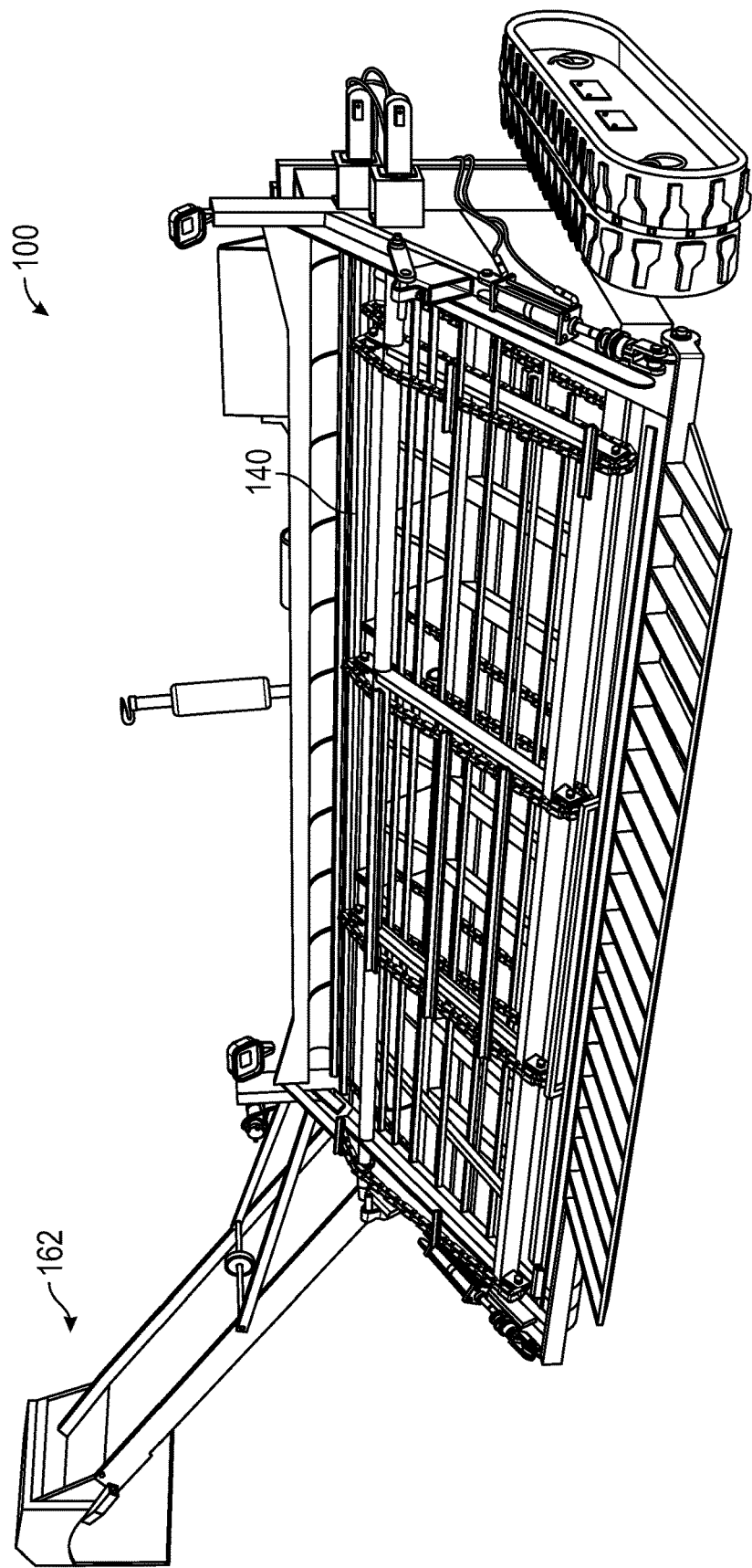
FIG. 2 illustrates a perspective view of a machine for extracting infill from artificial turf, in accordance with a representative embodiment.

FIG. 2 illustrates a perspective view of a machine for extracting infill from artificial turf, in accordance with a representative embodiment. In this figure, an embodiment of the chute 162 is shown on the machine 100. The figure also clearly shows the second roller 140.

Figure 3:
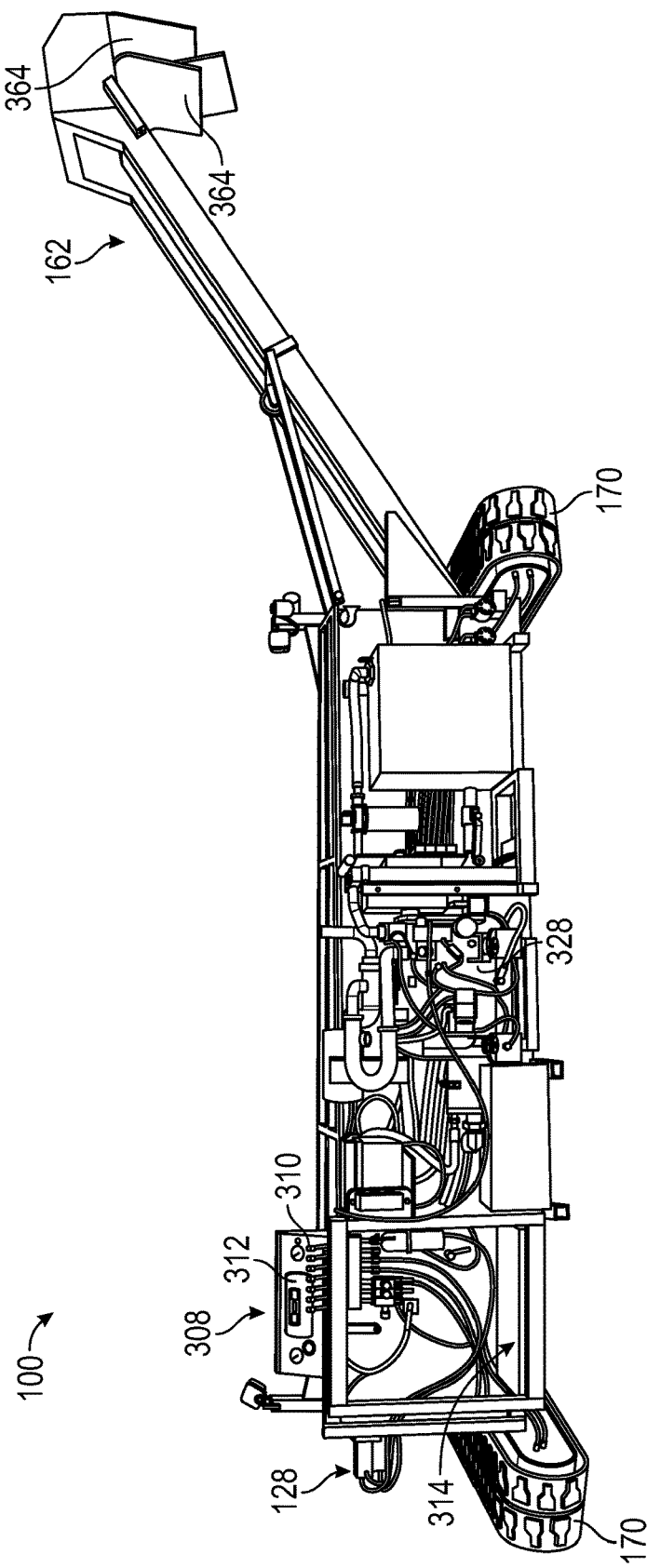
FIG. 3 illustrates a rear view of a machine for extracting infill from artificial turf, in accordance with a representative embodiment.

FIG. 3 illustrates a rear view of a machine for extracting infill from artificial turf, in accordance with a representative embodiment. In this figure, an embodiment of the chute 162 is shown on the machine 100, as well as a control station 308, and a drive motor 328 for moving the entire machine 100.

The chute 162 may include one or more guiding structures 364 structurally configured for directing infill that is removed from artificial turf. As shown in the figure, the guiding structures 364 may include a structure or housing that directs the infill in a desired direction—downward in the figure. The guiding structures 364 may also or instead include tubing or the like for directing the infill.

The control station 308 may include one or more controls 310 (e.g., levers or the like), a user interface 312, and a designated area 314 for an operator. The control station 308 may provide an operator with control over one or more components of the machine 100, e.g., through the one or more controls 310 or the user interface 312. For example, the control station 308 may provide an operator with control over movement of the entire machine 100, e.g., by controlling a throttle in communication with the drive motor 328 for driving the wheels 170 of the machine 100 and/or for steering the wheels 170 of the machine 100. The control station 308 may also or instead provide an operator with control over one or more of the following, which are provided by way of example and not of limitation: the first positioner, the second positioner, the one or more motors 128, the first conveyor, the second conveyor, the third conveyor, the second roller, the chute 162, the guiding structures 364, and so on.

The drive motor 328 may be configured to provide power to move the entire machine 100 (e.g., by driving the wheels 170 of the machine 100) or a component thereof.

Figure 4A:
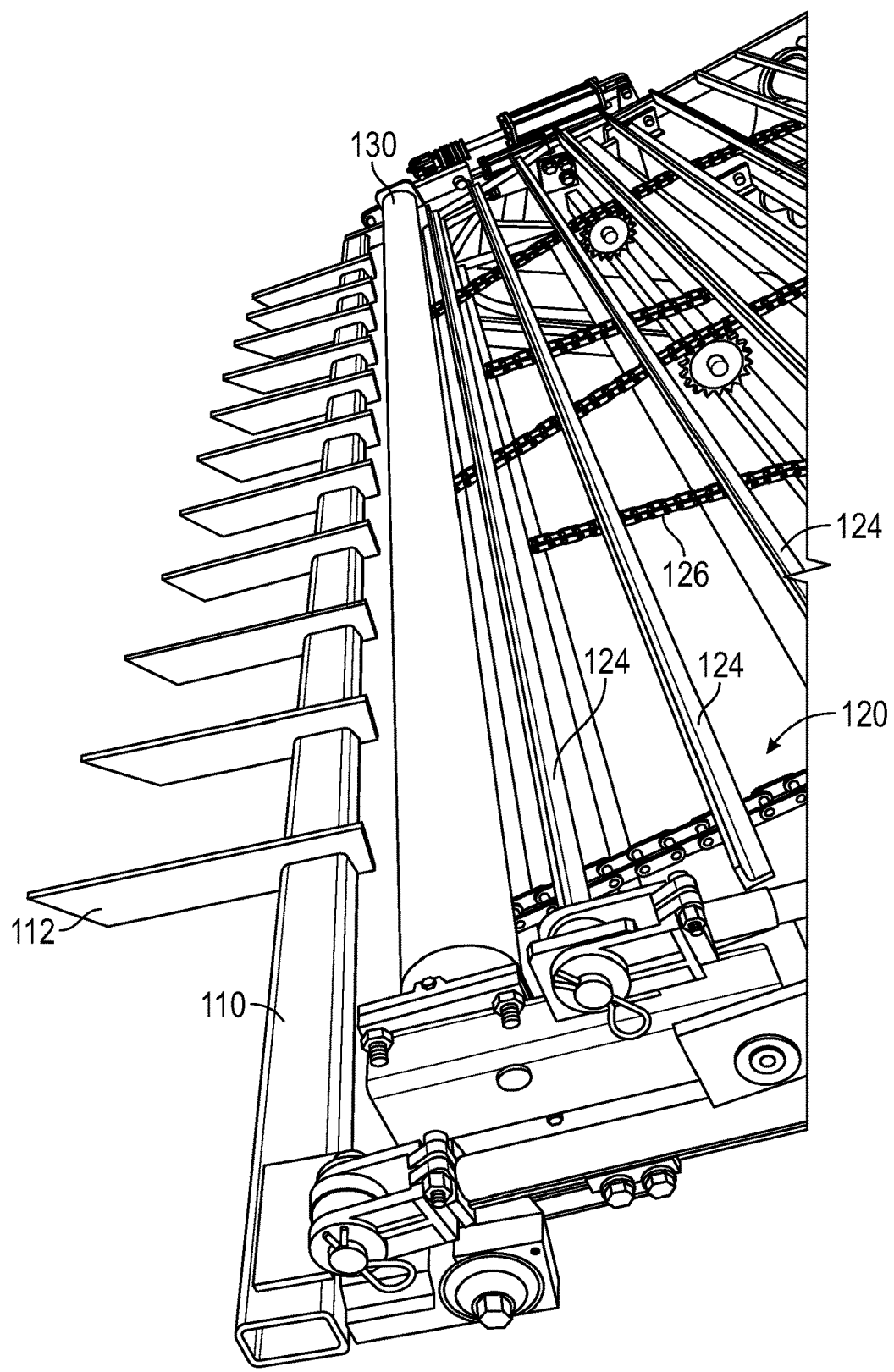
FIG. 4A illustrates a first end of a machine for extracting infill from artificial turf, in accordance with a representative embodiment.

FIG. 4A illustrates a first end of a machine for extracting infill from artificial turf, in accordance with a representative embodiment. In this figure, an embodiment of the rake 110 and the first roller 130 are clearly shown. In the embodiment shown in FIG. 4A, the rake 110 includes teeth 112 that are each substantially the same. In other embodiments, however, one or more of the teeth 112 may be different—e.g., having different shapes, sizes, orientations, and the like—and/or one or more of the teeth 112 may be independently controllable from one another. FIG. 4A also clearly shows the tracks 124 and chains 126 of the first conveyor 120.

Figure 4B:
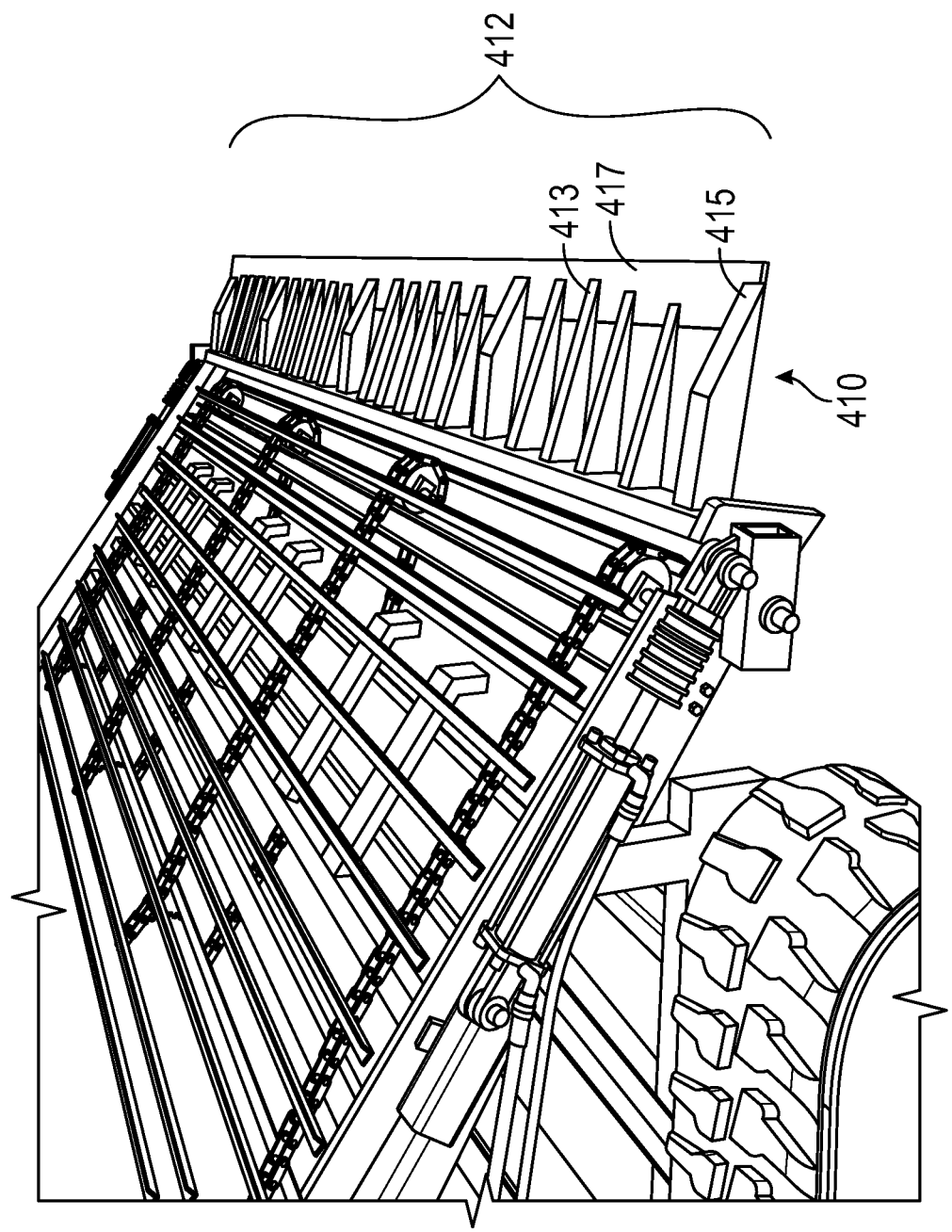
FIG. 4B illustrates a first end of a machine for extracting infill from artificial turf, in accordance with a representative embodiment.

FIG. 4B illustrates a first end of a machine for extracting infill from artificial turf, in accordance with a representative embodiment. In this figure, an embodiment of the rake 410 is shown that includes teeth 412 where one or more of the teeth 412 are different from one another. For example, the rake 410 may include first teeth 413 and second teeth 415 having different shapes—as shown in the figure, the first teeth 413 may be substantially triangular and the second teeth 415 may be wedge-shaped, where the second teeth 415 have a large surface area than the first teeth 413. The teeth 412 may be connected via a bar 417.

Figure 5:
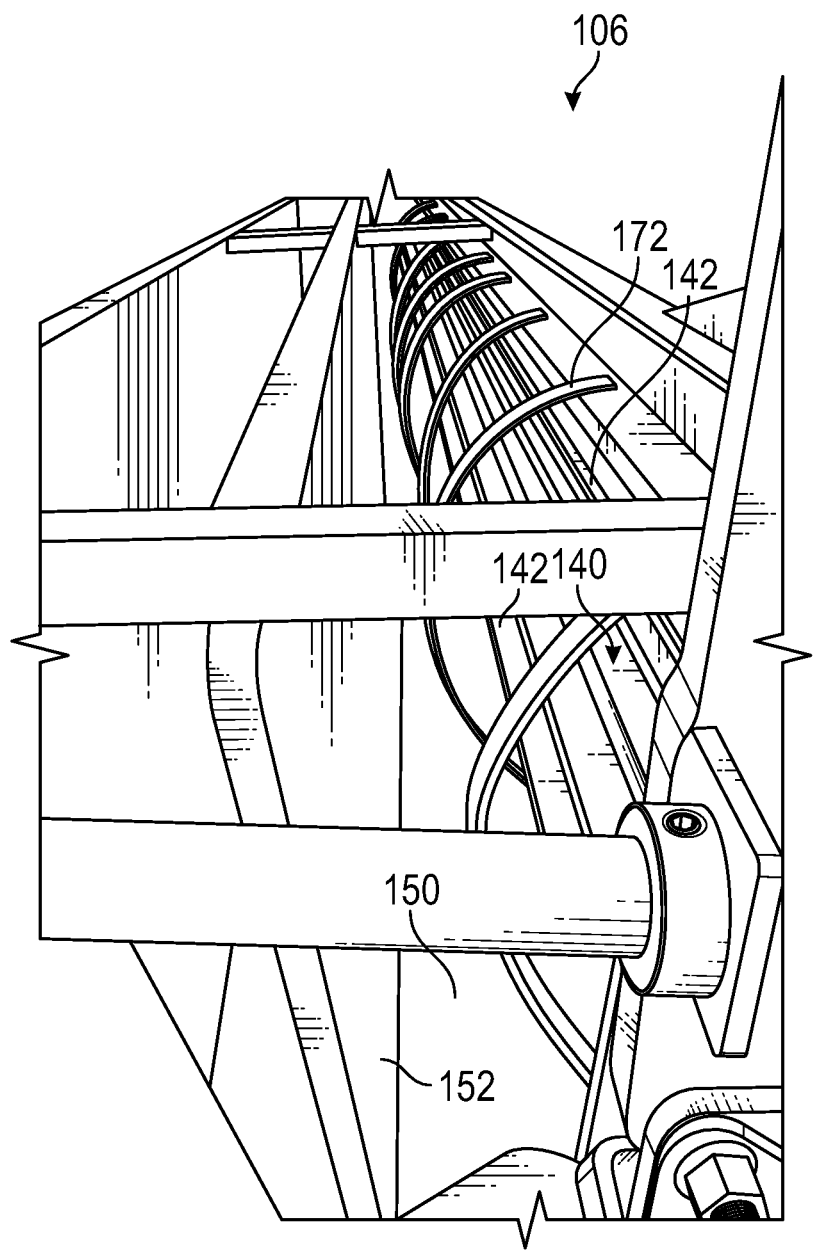
FIG. 5 illustrates a second end of a machine for extracting infill from artificial turf, in accordance with a representative embodiment.

FIG. 5 illustrates a second end of a machine for extracting infill from artificial turf, in accordance with a representative embodiment. As shown in the figure, the second end 106 of the machine may include one or more flaps 152 (or similar structures) for directing infill after it is extracted by the second roller 140, e.g., onto the second conveyor 150. The machine may also or instead include guides 172 disposed throughout the path traversed by the artificial turf through the machine for guiding the artificial turf and preventing jamming of the artificial turf. FIG. 5 also clearly shows the protrusions 142 on the second roller 140.

Figure 6:
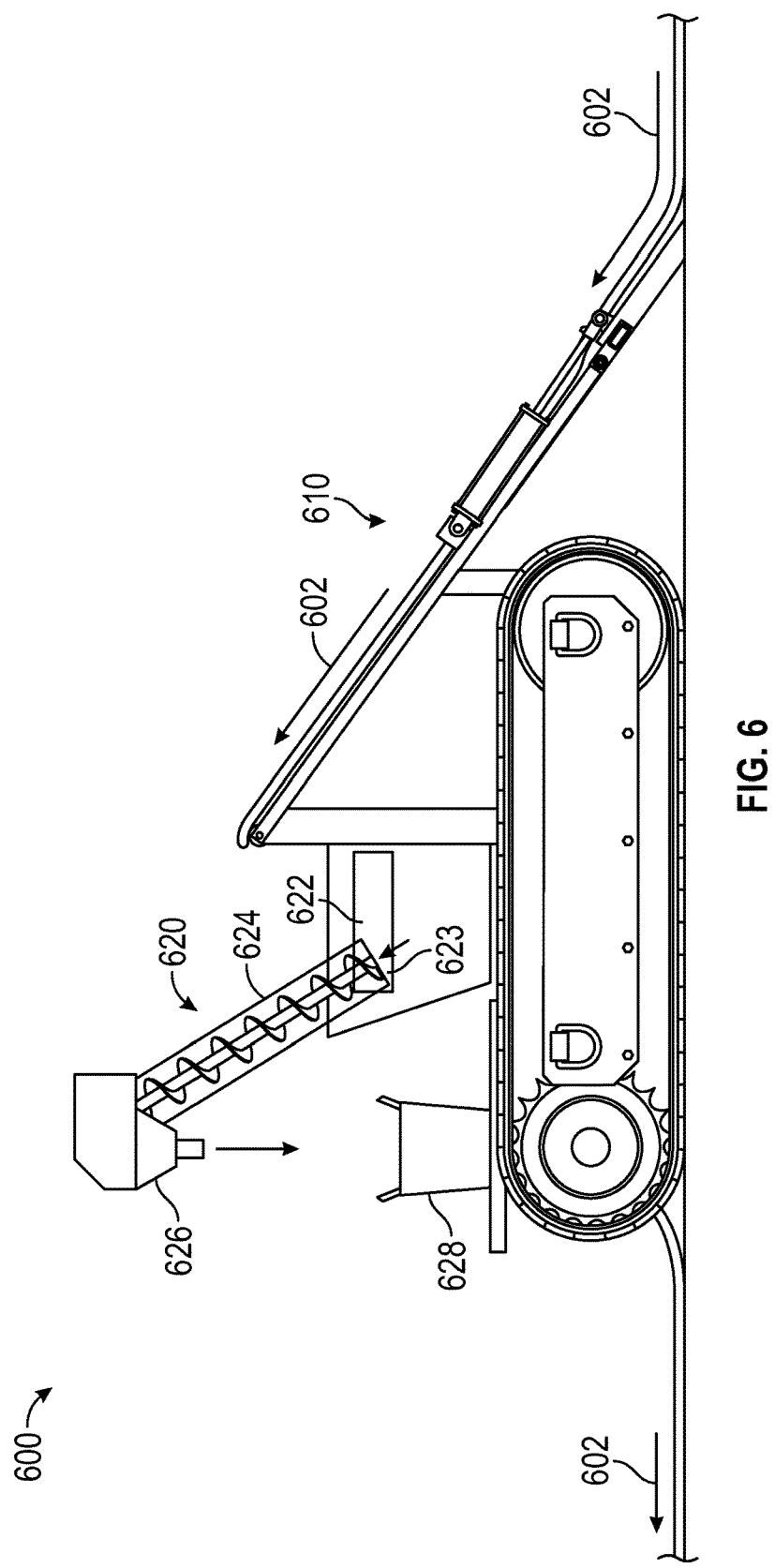
FIG. 6 illustrates a schematic of a machine for extracting infill from artificial turf, in accordance with a representative embodiment.

FIG. 6 illustrates a schematic of a machine for extracting infill from artificial turf, in accordance with a representative embodiment. The machine 600 may include one or more subsystems, e.g., a first subsystem 610 for extracting infill from artificial turf and a second subsystem 620 for the collection of the infill extracted from the artificial turf. The arrows 602 in the figure generally depict a path that a length of artificial turf may traverse through the machine 600.

The first subsystem 610 may be the same or similar to any of the machines described herein for extracting infill from artificial turf. For example, the first subsystem 610 may include a rake, a first conveyor, a first roller, and a second roller. Infill may be extracted from the artificial turf where it falls onto or is otherwise directed to the second subsystem 620, and more particularly a second conveyor 622 of the second subsystem 620.

The second subsystem 620 may be structurally configured for the collection of infill extracted from artificial turf (e.g., by the first subsystem 610), where the second subsystem 620 includes a second conveyor 622, a third conveyor 624, a depositor 626, and a collection bin 628. The infill may travel from the first subsystem 610 to the second conveyor 622, then to the third conveyor 624, through the depositor 626, and into the collection bin 628.

The second conveyor 622 may be the same or similar to the second conveyor 150 described above with reference to FIG. 1, or elsewhere herein. The second conveyor 622 (or any of the conveyors described herein) may include any type of conveyor system known in the art for moving materials such as infill from one location to another, e.g., a belt conveyor system with two or more drums (which may include pulleys, gears, rollers, and the like) and a continuous loop of a carrying medium such as a conveyor belt that rotates about the drums. One or more of the drums may be powered by a motor that rotates the drums and drives the carrying medium. The second conveyor 622 may also or instead include other types of conveyors, e.g., screw conveyors or auger conveyors.

In an implementation, the second conveyor 622 includes two or more conveyors in series. In another implementation, the second conveyor 622 includes at least two conveyors that rotate in opposite directions, e.g., to feed the infill to a central location of the machine 600. The second conveyor 622 may be substantially horizontally aligned within the machine 600. In another implementation, the second conveyor 622 includes one or more conveyors disposed at angles relative to a horizontal axis, e.g., so as to funnel the infill into a predetermined location using gravity (e.g., mechanically assisted or completely gravity-fed). Thus, in an implementation, the second conveyor 622 or any of the other conveyors described herein may include, or may be supplemented or replaced by, an inclined pathway, a funnel, or another similar non-motorized pathway for the infill—e.g., a pathway that utilizes gravitational forces to direct the infill.

The second conveyor 622 may receive the infill from the first subsystem 610 for directing the infill to the third conveyor 624.

The third conveyor 624 may be the same or similar to the third conveyor 160 described above with reference to FIG. 1. In an implementation, the third conveyor 624 includes a screw conveyor or the like. The screw conveyor may utilize a rotating helical screw (sometimes referred to as a "fighting") within a housing (e.g., a substantially cylindrical tube) to transport the infill from a first location to a second location. The first location and the second location may be disposed at different elevations. In this manner, the third conveyor 624 may transport the infill to a z-axis position greater than a z-axis position of the second conveyor 622 or a portion thereof (e.g., a convergence area 623 for the infill within the second conveyor 622). The third conveyor 624 may be engaged with the depositor 626 at the second location. The third conveyor 624 and the depositor 626 may form a chute, e.g., the same or similar chute 162 as described above with reference to FIG. 1.

The third conveyor 624 may receive the infill from the second conveyor 622 for directing the infill to the depositor 626 and into one or more collection bins 628. In an implementation, the second conveyor 622 and the third conveyor 624 are combined into a single conveyor system.

The depositor 626 may be in communication with the third conveyor 624, where the depositor 626 forms a pathway for discharging the infill from an end of the third conveyor 624 to one or more collection bins 628. The depositor 626 may be adjustable and controllable—e.g., one or more of a size, a shape, and a position of the depositor 626 may be adjustable and controllable. For example, a length of the depositor 626 may be adjustable and controllable. The position of the depositor 626 may also or instead be adjustable and controllable, along multiple axes. The depositor 626 may include, or otherwise be formed by, guiding structures 364 such as those described with reference to FIG. 3. In an implementation, one or more of the third conveyor 624 and the depositor 626 are positionable for alignment with one or more collection bins 628.

The collection bin 628 may be structurally configured to receive infill from the depositor 626. The collection bin 628 may include a container or the like for the infill including without limitation a bag, a sack (e.g., a "super sack" as known in the art), a basket, a bin, a bucket, a box, a truck bed, and the like. The collection bin 628 may be structurally configured to receive a predetermined amount of infill, where the predetermined amount of infill is based on one or more of volume and weight. In an implementation, the collection bin 628 is structurally configured to receive about two thousand pounds of infill.

Figure 7A:
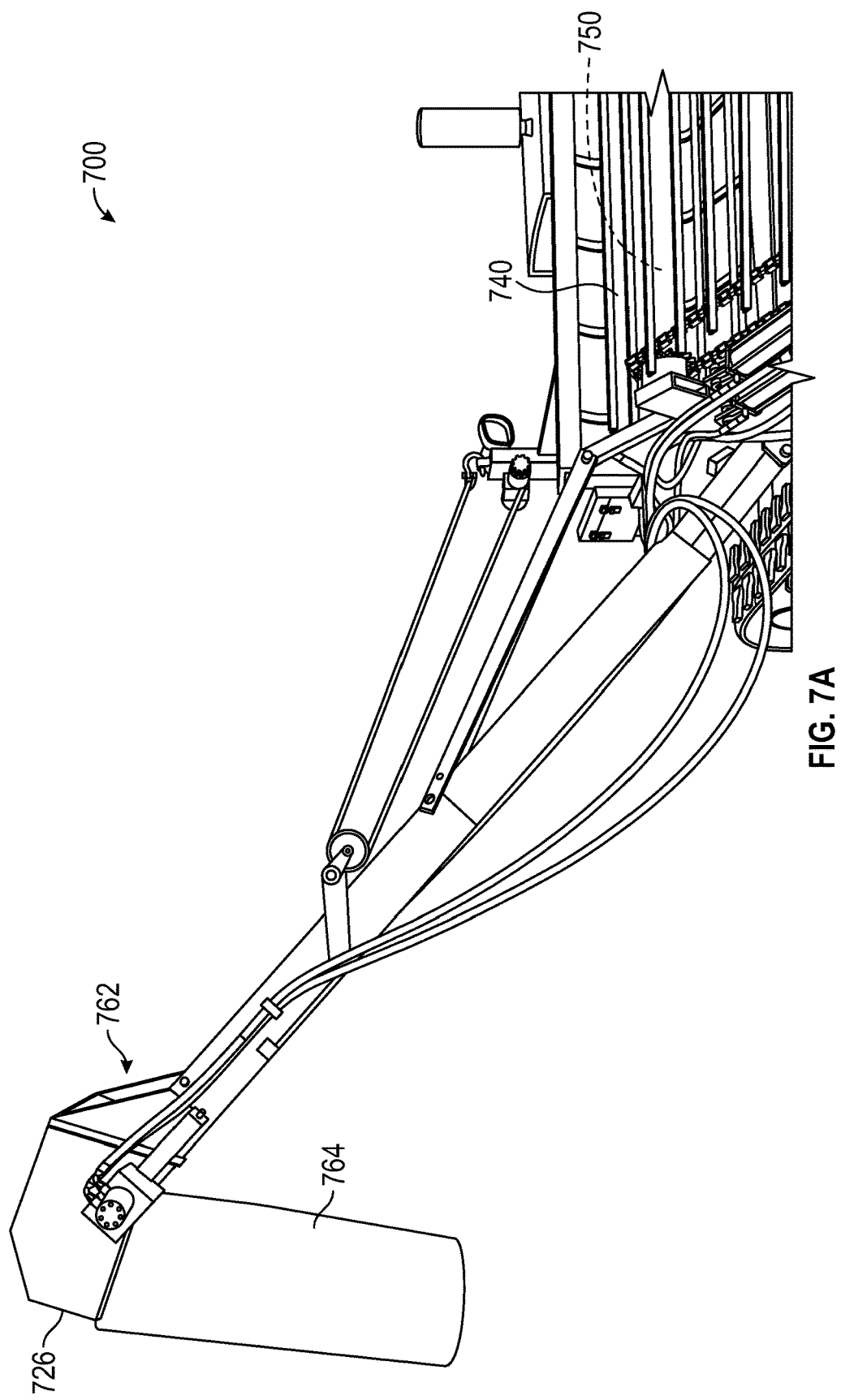
FIG. 7A illustrates an infill discharge of a machine for extracting infill from artificial turf, in accordance with a representative embodiment.

FIG. 7A illustrates an infill discharge of a machine for extracting infill from artificial turf, in accordance with a representative embodiment. The infill discharge 700 may be the same or similar to the second subsystem 620 described above, or it may be different. The infill discharge 700 may include a second conveyor 750 disposed under the second roller 740, a chute 762, and a depositor 726. Specifically, in implementations, the infill discharge 700 includes a chute 762 in communication with a depositor 726 formed by one or more guiding structures 764.

Figure 7B:
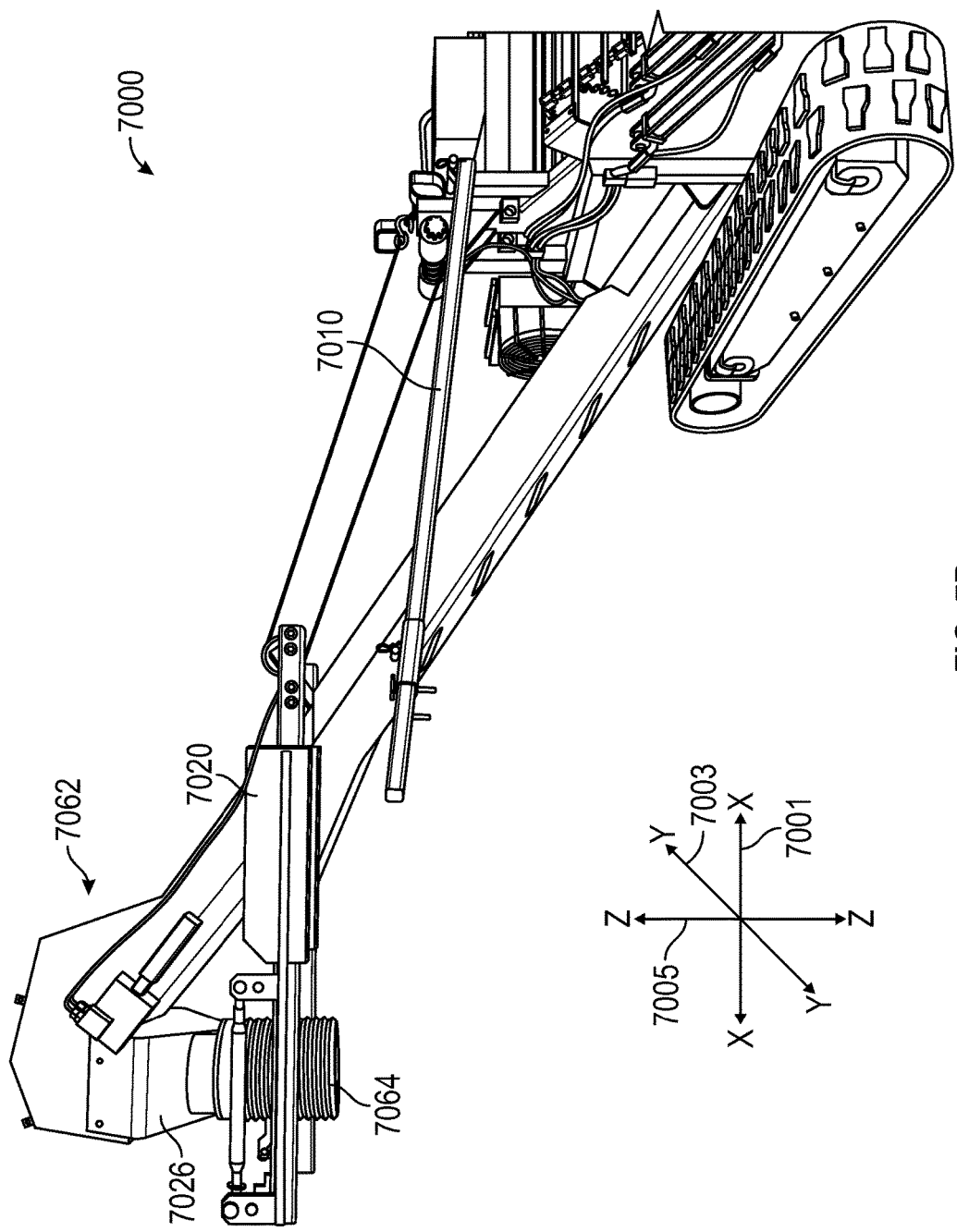
FIG. 7B illustrates an infill discharge of a machine for extracting infill from artificial turf, in accordance with a representative embodiment.

FIG. 7B illustrates an infill discharge of a machine for extracting infill from artificial turf, in accordance with a representative embodiment. Again, the infill discharge 7000 may be the same or similar to the second subsystem 620 described above, or it may be different. Here, in the embodiment shown in FIG. 7B, the infill discharge 7000 includes a chute 7062 in communication with a depositor 7026 formed by a guiding structure 7064 having a generally tubular shape for directing infill into a desired location, e.g., a container such as a bag.

The infill discharge 7000 may include one or more supports, e.g., a first support 7010 and a second support 7020. In implementations, one or more of the first support 7010 and the second support 7020 are movable using one or more positioners such as any as described herein, e.g., hydraulic actuators, pulleys, gears, and so on. Movement of one or more of the first support 7010 and the second support 7020 may provide for movement of one or more of the chute 7062, depositor 7026, and the guiding structure 7064, along one or more of an x-axis 7001, a y-axis 7003, and a z-axis 7005. Movement of one or more of the first support 7010 and the second support 7020 may also or instead provide for rotation or translation of one or more components of the infill discharge 7000. The infill discharge 7000 may include one or more container supports as further described below.

Figure 7C:
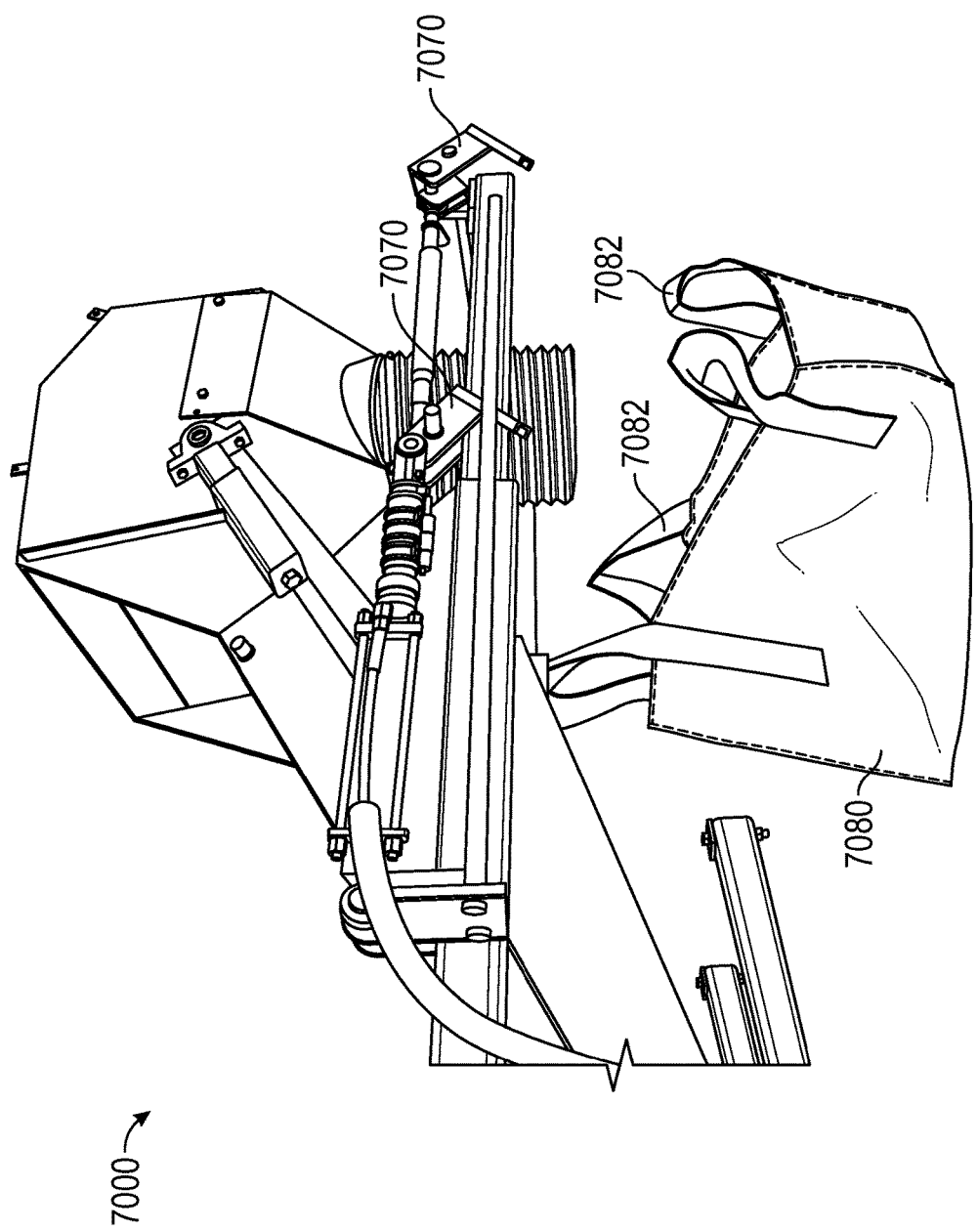
FIG. 7C illustrates an infill discharge of a machine for extracting infill from artificial turf, in accordance with a representative embodiment.

FIG. 7C illustrates an infill discharge of a machine for extracting infill from artificial turf, in accordance with a representative embodiment. This figure shows an alternate view of the infill discharge 7000 described above, where container supports 7070 are clearly shown. Specifically, in an implementation, an infill discharge 7000 includes a number of container supports 7070 structurally configured to engage with a corresponding number of handles 7082 of a container 7080, e.g., at least four container supports 7070 structurally configured to engage with at least four handles 7082 of a container 7080 (e.g., a bag).

Each of the container supports 7070 may be positionable between a first position for holding the container 7080 via its handles 7082 and a second position (shown in FIG. 7C) for releasing the container 7080. The positioning of the container supports 7070 may be provided by one or more positioners, such as any as described herein.

Figure 8:
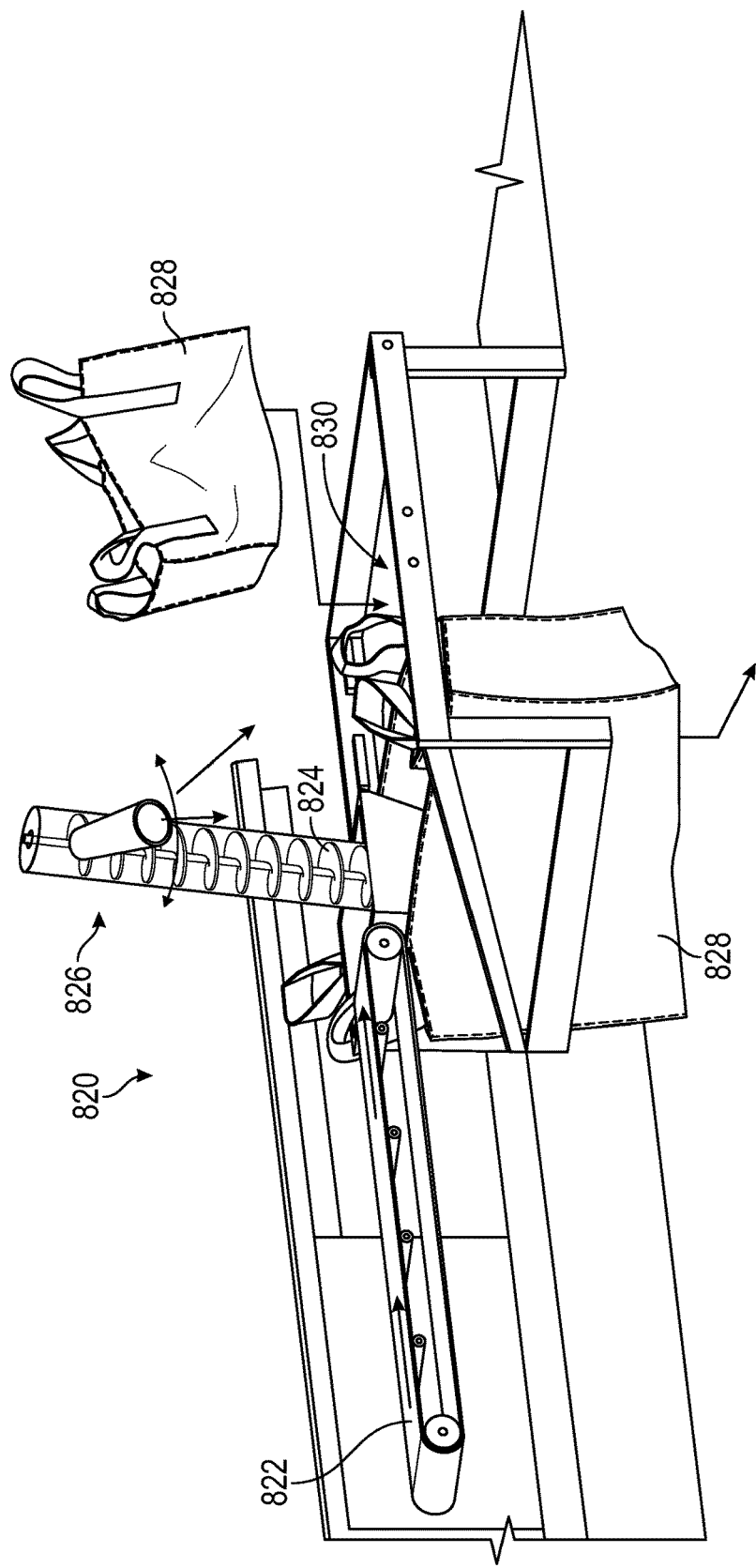
FIG. 8 illustrates a schematic of an infill discharge of a machine for extracting infill from artificial turf, in accordance with a representative embodiment.

FIG. 8 illustrates a schematic of an infill discharge of a machine for extracting infill from artificial turf, in accordance with a representative embodiment. Specifically, this figure illustrates an embodiment of a second subsystem 820, which may be the same or similar to the second subsystem 620 described above with reference to FIG. 6. The second subsystem 820 may include a second conveyor 822, a third conveyor 824, a chute 826, and one or more collection bins 828 or other containers.

As shown in the figure, the chute 826 may be movable to direct the infill into the one or more collection bins 828. For example, in one implementation, the chute 826 is structurally configured to move with two-degrees of freedom. In another implementation, the chute 826 is structurally configured to move with three-degrees of freedom. Other components of the second subsystem 820 may also or instead be structurally configured to move such as the second conveyor 822 (e.g., the second conveyor 822 may be positionable to have an end disposed in communication with an end of the third conveyor 824), the third conveyor 824 (e.g., the third conveyor 824 may be positionable to align the chute 826 for depositing infill into a collection bin 828), and the one or more collection bins 828.

The collection bins 828 may be placed into a receiving area 830 configured to receive the infill from the chute 826. The receiving area 830 may be structurally configured for receiving one or more of the collection bins 828. The collection bins 828 may be movable within the receiving area 830, e.g., to form a queue for receiving the infill from the chute 826. Once a collection bin 828 is full of infill (or infill within the collection bin 828 reaches a desired amount, e.g., based on weight or volume), the collection bin 828 may be removed from the receiving area 830.

The chute 826 may continue to deposit infill while switching between collection bins 828, e.g., in an implementation where the receiving area 830 is configured to hold more than one collection bin 828. For example, two or more collection bins 828 may be disposed directly adjacent to one another within the receiving area 830, and the chute 826 may switch from depositing infill from a first collection bin to a second collection bin through movement of one or more of the chute 826, the third conveyor 824, or the collection bins 828 themselves.

A collection bin 828 may be removed from the receiving area 830 through releasing an engagement between the collection bin 828 and the machine, e.g., an engagement between the collection bin 828 and one or more elements forming a support structure for the receiving area 830 (e.g., beams, braces, or the like). Releasing an engagement between the collection bin 828 and the machine may cause the collection bin 828 to drop onto a surface or area disposed below the receiving area 830, e.g., a field in which infill is being removed from artificial turf. The collection bin 828 may be replaced automatically or manually (e.g., by an operator of the machine, or by a technician following the machine).

Figure 9:
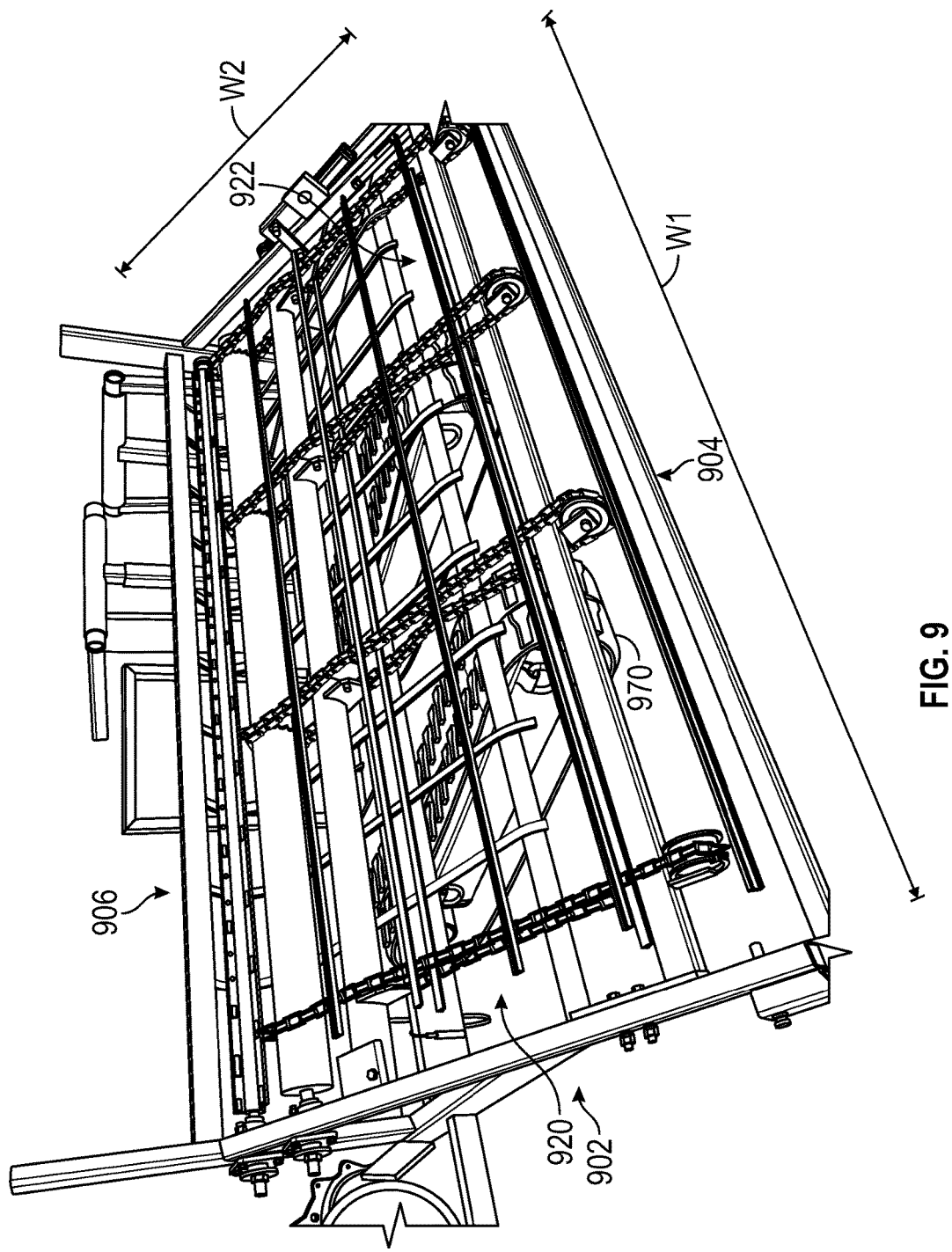
FIG. 9 illustrates a perspective view of a machine for extracting infill from artificial turf, in accordance with a representative embodiment.

FIG. 9 illustrates a perspective view of a machine for extracting infill from artificial turf, in accordance with a representative embodiment. The machine 900 may be similar to those discussed elsewhere herein, e.g., with reference to FIG. 1 above, but the machine 900 shown in FIG. 9 may include additional features.

These additional features may include, for example, design features that enable the machine 900 to rotate or swivel, e.g., anywhere from 0 degrees to 360 degrees. For example, in an implementation, the machine 900 is capable of rotating at least about 90 degrees, which may advantageously allow the machine 900 to maneuver into confined spaces or tight quarters (e.g., through a door, a gate, a fence opening, or the like). To this end, the machine 900 may include wheels 970 (e.g., continuous tracks) that are spaced apart by a distance less than or equal to a minimum length of the first conveyor portion 920 of the machine 900 (e.g., the conveyor portion for transporting artificial turf from a front end 904 to a back end 906 of the machine 900). This minimum length may be a length of one of the front, the back, the right side, or the left side of the first conveyor portion 920 of the machine 900. In an implementation, the wheels 970 are spaced apart by a distance less than or equal to a width of the side 902 of the first conveyor portion of the machine 900, where the width of the side 902 of the first conveyor portion 920 of the machine 900 is less than the width of the front end 904 or back end 906 of the first conveyor portion 920 of the machine 900. In this manner, if the first conveyor portion 920 of the machine 900 is rotated about 90 degrees from the position shown in the figure (such that it is facing sideways instead of facing forward), the machine 900 would be able to fit through smaller spaces without a need for maneuvering or turning of the wheels 970. For example, in an implementation, the machine 900 has a maximum first width W1 along its front end 904 (or back end 906) of about 10-12 feet, and a maximum second width W2 along its side 902 (e.g., right side and left side) of less than about 8.5 feet (other dimensions are also or instead possible). In other words, if, in the figure shown, the first width W1 (e.g., the width of the front of the machine 900) is about 12 feet, but the second width W2 (e.g., the width of the sides) and the spacing between the wheels 970 is about 8 feet, rotating the top of the machine 900 about the wheels 970 such that a plane of the side 902 of the machine 900 was substantially perpendicular to the direction of travel of the wheels 970, the machine 900 would be able to fit through openings of about 8.5 feet, which may a be a common width of gates for turf fields. Conversely, if the machine 900 were not rotated, the machine 900 may only be able to fit through openings that are greater than about 12 feet.

By way of another example, the machine 900 may be capable of rotating substantially 180 degrees, which may advantageously allow the machine 900 to reverse the direction in which it is collecting infill without having to turn around using the wheels 970. In this manner, the machine 900 may travel in a first direction, stop, rotate substantially 180 degrees, reverse the direction of the wheels 970 (but without turning, e.g., reverse a direction of the continuous track), and then travel in a second direction that is substantially opposite the first direction. In embodiments including relatively large or otherwise cumbersome machines 900, the ability to rotate in this manner may save valuable time that would otherwise be spent turning the entire machine 900 using only the wheels 970. In an implementation, turning the machine 900 is accomplished using a combination of turning the wheels 970 and rotating the first conveyor portion 920 of the machine 900 as described herein.

The rotation or swiveling of the machine 900 may be provided by a motor (e.g., a separate motor from the drive motor of the machine 900 or the same motor) that turns one or more gears engaged with the bottom of the first conveyor portion 920 of the machine 900. In this manner, the first conveyor portion 920 of the machine 900 may sit upon or otherwise be engaged with a rotatable platform, base, housing, or other structure. Other mechanisms for rotating or swiveling the machine 900 may also or instead be provided as will be apparent to one of ordinary skill in the art.

Other features of the embodiment shown in FIG. 9 may include, for example, a steeper inclined surface 922 and two or more rollers (similar to the first roller 130 described with reference to FIG. 1) to apply a downward force to a top surface (i.e., the inclined surface 922) of the first conveyor portion 920. The steeper inclined surface 922 may provide a reduced depth to the machine 900 (e.g., which in conjunction with the rotation described above may allow the machine 900 to fit within relatively small openings), and the two or more rollers may provide stability for artificial turf disposed along this steeper inclined surface 922.

Figure 10:
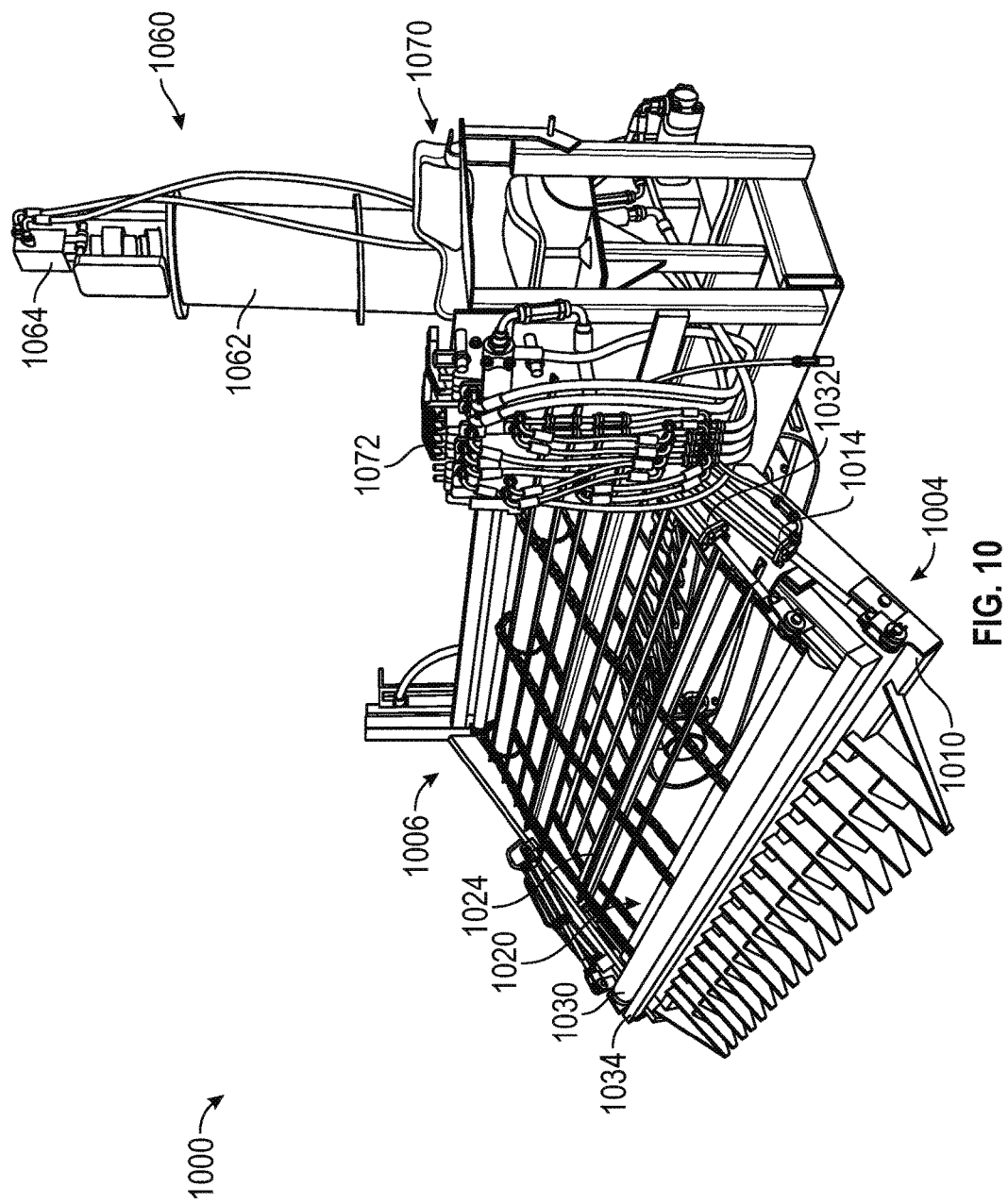
FIG. 10 illustrates a side perspective view of a machine for extracting infill from artificial turf, in accordance with a representative embodiment.

FIG. 10 illustrates a side perspective view of a machine for extracting infill from artificial turf, in accordance with a representative embodiment. The embodiment of the machine 1000 shown in FIG. 10 includes a rake 1010 movable via a first positioner 1014, a first conveyor 1020 featuring tracks 1024 configured to move artificial turf from a first end 1004 of the machine 1000 to the second end 1006 of the machine 1000, a first roller 1030, a stabilizer 1034, a vertical conveyor 1060, and a control station 1070.

The stabilizer 1034 may be structurally configured to guide or stabilize artificial turf on the first conveyor 1020, where the stabilizer 1034 can be disposed in front of the first roller 1030 as shown in the figure or behind the first roller 1030. The stabilizer 1034 may include a beam, a bar, or another similar structure. The stabilizer 1034 may also or instead include a roller, e.g., in addition to the first roller 1030. The stabilizer 1034 may also or instead include the first roller 1030. In an implementation, the stabilizer 1034 is movable; in another implementation, the stabilizer 1034 is substantially stationary.

One or more of the first roller 130 and the stabilizer 1034 may be movable, e.g., via a second positioner 1032. In an implementation, the first roller 130 and the stabilizer 1034 are movable via the same positioner; in another implementation, the first roller 130 and the stabilizer 1034 are movable via a different positioner.

The vertical conveyor 1060 may include a screw conveyor or the like. The vertical conveyor 1060 may utilize a rotating helical screw within a substantially cylindrical tube 1062 that is driven by a motor 1064 to transport the infill along a z-axis. The vertical conveyor 1060 may receive infill from another conveyor (e.g., the second conveyor as described elsewhere herein) or through other means, e.g., a funnel, a pathway, or the like.

The control station 1070 may be physically connected to the machine 1000 as shown in the figure. In another implementation, the control station may be a remote station. The control station 1070 may be the same or similar to that described with reference to FIG. 3 above, including a user interface and one or more controls 1072.

Figure 11:
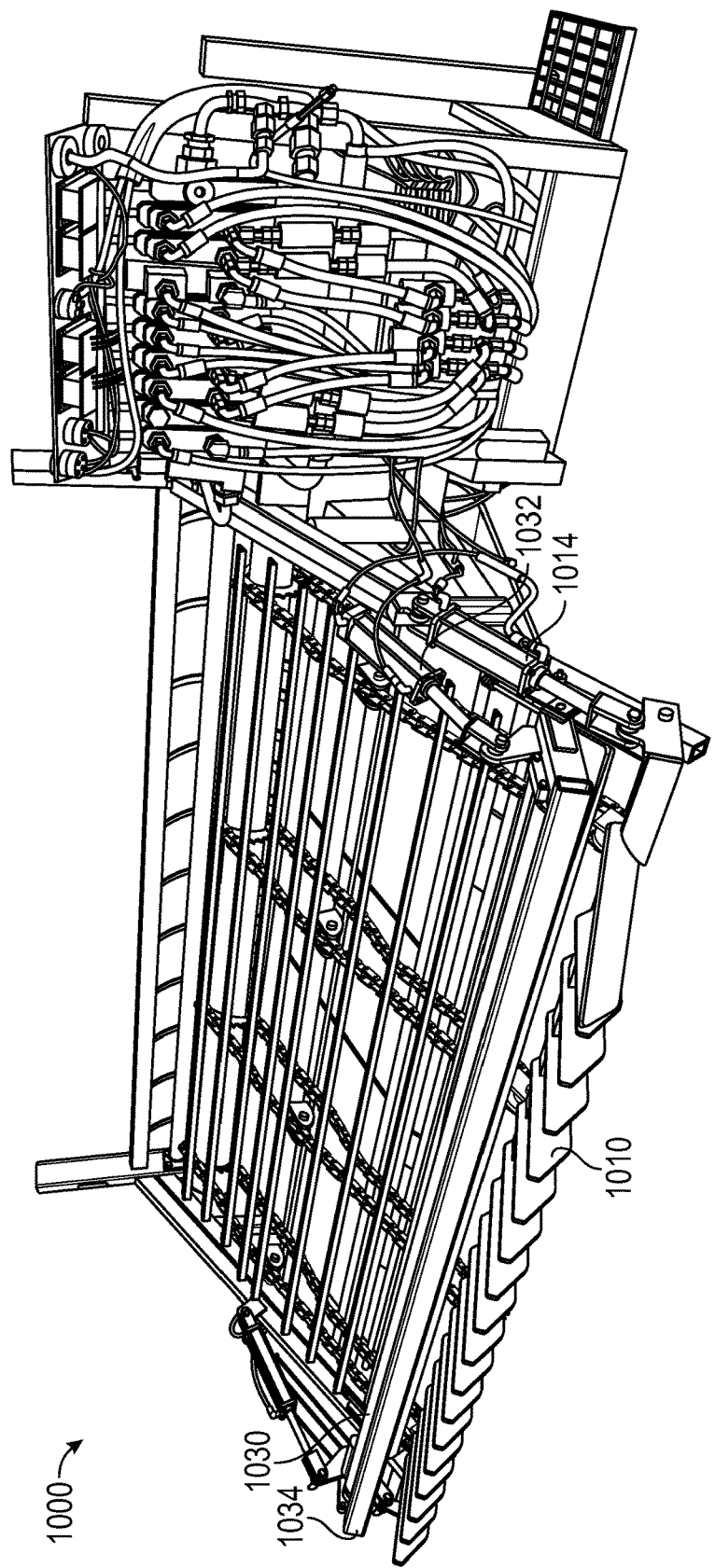
FIG. 11 illustrates a front perspective view of a machine for extracting infill from artificial turf, in accordance with a representative embodiment.

FIG. 11 illustrates a front perspective view of a machine for extracting infill from artificial turf, in accordance with a representative embodiment. The machine 1000 shown in FIG. 11 may be the same or similar to that shown in FIG. 10. In FIG. 11, however, the rake 1010, the first roller 1030, and the stabilizer 1034 may be moved into different positions relative to what is shown in FIG. 10. As discussed herein, the movement of one or more of the rake 1010, the first roller 1030, and the stabilizer 1034 may be provided by one or more positioners, e.g., the first positioner 1014 and the second positioner 1032.

Figure 12:
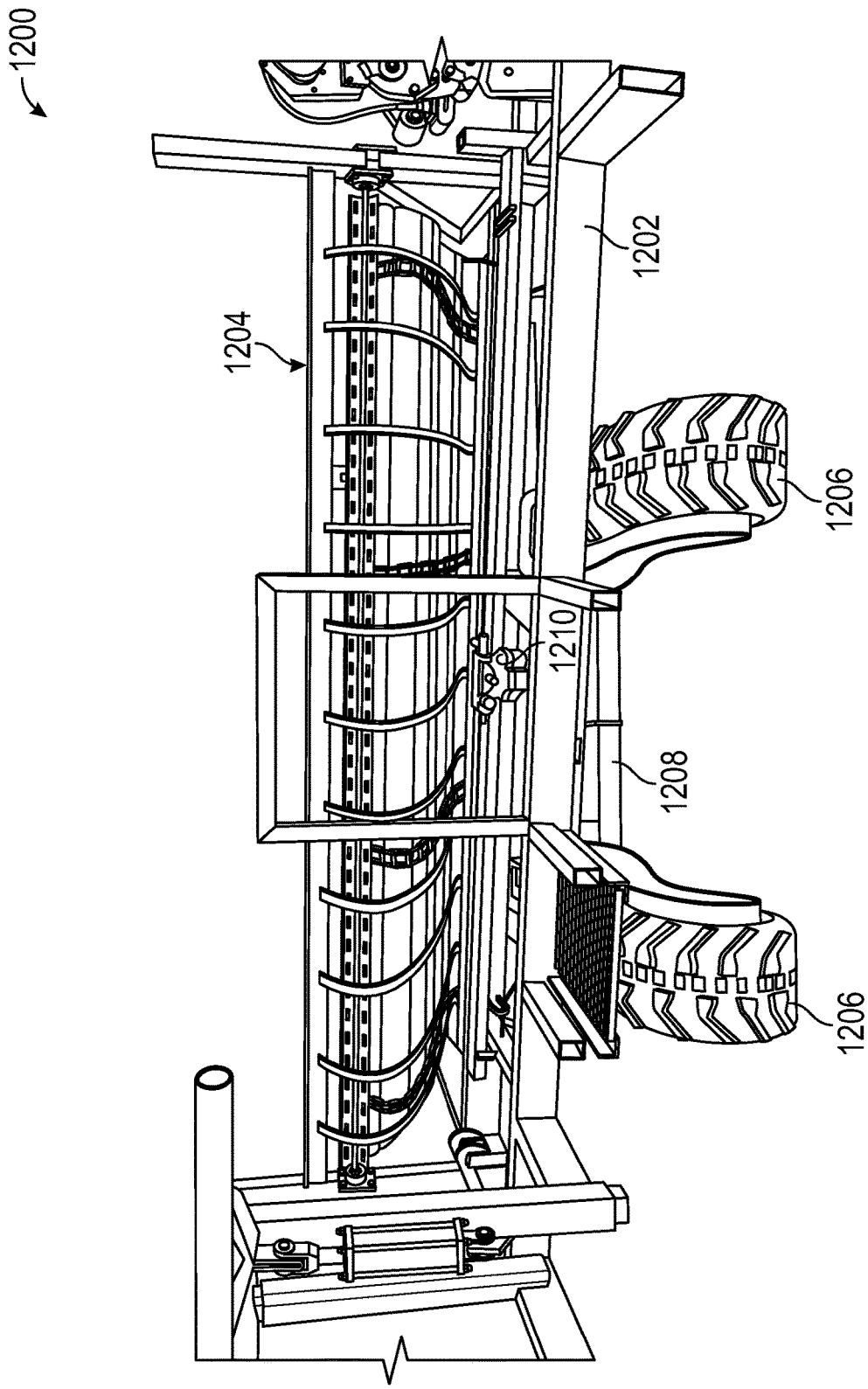
FIG. 12 illustrates a rear view of a machine for extracting infill from artificial turf, in accordance with a representative embodiment.

FIG. 12 illustrates a rear view of a machine for extracting infill from artificial turf, in accordance with a representative embodiment. This figure shows a machine 1200 featuring a motor 1210 that may be used for rotating the base 1202 of the machine 1200 relative to its wheels 1206, e.g., turning one or more gears engaged with the base 1202 (or otherwise with the bottom of the first conveyor portion 1204 of the machine 1200) and a subframe 1208 engaged with the wheels 1206 (or otherwise with a drivetrain of the machine 1200).

The base 1202 may be structurally configured for holding the machine 1200 generally, or one or more of its components, including without limitation, one or more of the first conveyor, the rake, the first roller, the second roller, and the second conveyor. The base 1202 may be rotatable relative to the subframe 1208 of the machine 1200 via the one or more gears. The machine 1200 may include a motor 1210 configured to drive rotation of the base 1202 relative to the subframe 1208.

Figure 13:
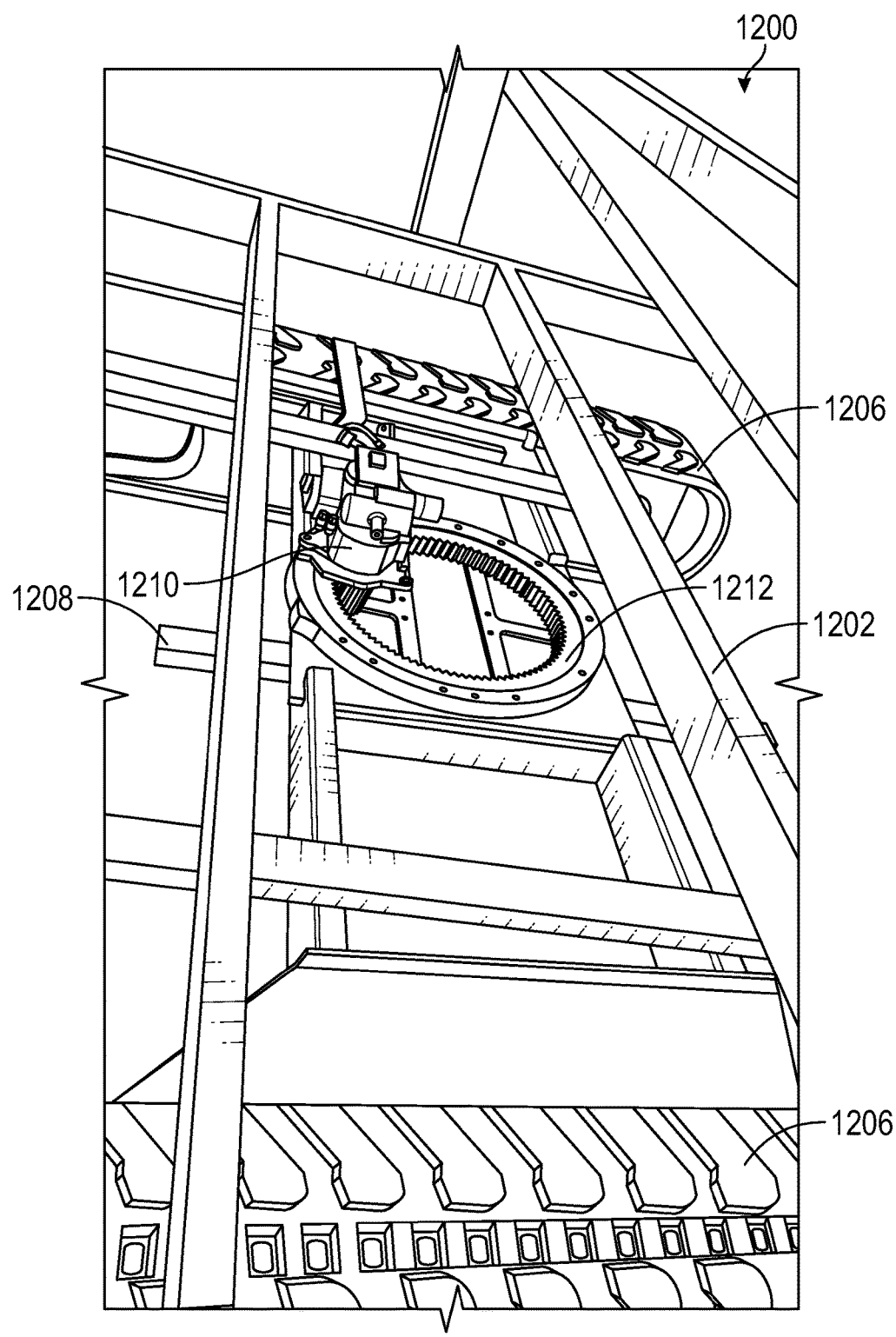
FIG. 13 illustrates a rotation device for a machine for extracting infill from artificial turf, in accordance with a representative embodiment.

FIG. 13 illustrates a rotation device for a machine for extracting infill from artificial turf, in accordance with a representative embodiment. The machine 1200 shown in this figure may be the same or similar to that shown and described with reference to FIG. 12. The machine 1200 may include a motor 1210 for driving one or more gears 1212 that rotate the base 1202 of the machine 1200 relative to a subframe 1208 engaged with the wheels 1206 of the machine 1200 or otherwise with a drivetrain of the machine 1200. The rotation device may also or instead provide for rotation of a portion of the machine 1200—the first conveyor portion or otherwise.

Figure 14:
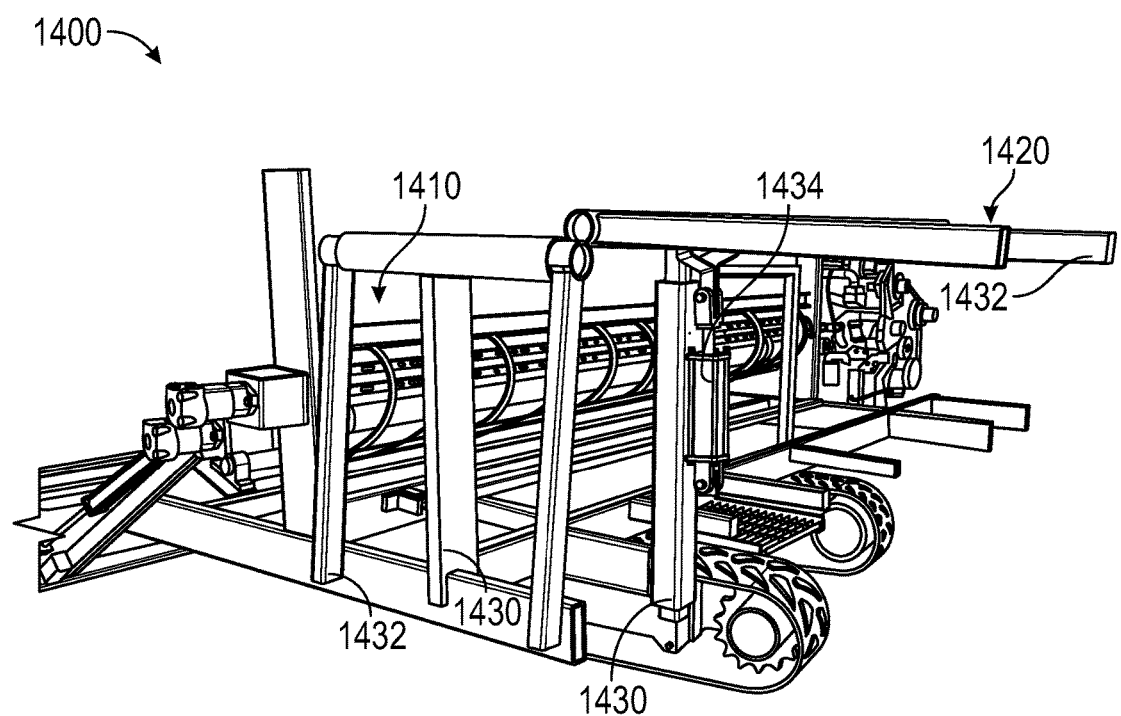
FIG. 14 illustrates a rear perspective view of a machine for extracting infill from artificial turf, in accordance with a representative embodiment.

FIG. 14 illustrates a rear perspective view of a machine for extracting infill from artificial turf, in accordance with a representative embodiment. This figure may represent a portion of a machine 1400 that is used for infill collection, e.g., for filling one or more collection bins as described herein. In particular, infill may be collected in one or more receiving areas, where two such receiving areas are shown in the figure—a first receiving area 1410 and a second receiving area 1420.

As shown in the figure, each of the receiving areas may include a holder 1430 structurally configured for engagement with a collection bin or container for holding infill discharged from the machine 1400 (e.g., a bag to receive infill extracted from artificial turf). In an implementation, the holder 1430 includes one or more arms 1432. The one or more arms 1432 may be movable from a first position to a second position. The first position may be a position where the arms 1432 engage with a collection bin by holding it in a receiving posture for accepting infill extracted from the artificial turf. The second position may be a position where the arms 1432 are structurally configured to release engagement with a collection bin, e.g., by dropping the collection bin when it becomes filled with a desired amount of infill (e.g., by volume or weight). In an implementation, the machine includes at least two receiving areas such that at least one of the holders 1430 is in the first position for accepting infill extracted from the artificial turf while another holder 1430 is in the second position for releasing a collection bin filled with a desired amount of infill.

Movement of the holder 1430 from the first position to the second position (and vice-versa) may be facilitated using an actuator 1434, e.g., a hydraulic actuator or the like that is controlled by a controller. In an implementation, the actuator 1434 (or controller) must be activated by an operator to release engagement with a collection bin. In another implementation, when the collection bin reaches a certain fill volume or weight, the collection bin is automatically released from engagement with the holder 1430.

In an implementation, one or more holders 1430 may be positioned such that a screw conveyor or the like can be positioned to deposit infill within a collection bin held in position by the one or more holders 1430. For example, a screw conveyor may be adjustable, movable, swivelable, or the like for positioning an outlet end of the screw conveyor above or adjacent to the receiving areas. In this manner, while in operation, the screw conveyor may deposit infill into a first receiving area 1410 including a collection bin held by a first holder in the first position where the first holder is engaging the collection bin in an open state for receiving the infill therein. When the collection bin reaches a predetermined or otherwise acceptable/desired volume or weight (e.g., when it is full), the screw conveyor may be swiveled or otherwise moved (e.g., manually by an operator, or automatically with a controller) to deposit infill into a second receiving area 1420 that includes another collection bin, e.g., held by a second holder in the first position where the second holder is engaging the collection bin in an open state for receiving the infill therein. Once the screw conveyor is moved from depositing in the first receiving area 1410, the first holder may disengage with the collection bin, e.g., the arms 1432 of the first holder may be moved to the second position as described herein to release the collection bin (e.g., onto the ground for pickup by a separate machine). The first holder may then be engaged with another (e.g., empty) collection bin (e.g., manually by an operator, or automatically with a controller) for receiving infill once the collection bin held by the second holder reaches a predetermined volume or weight (e.g., it is full). In this manner, the machine 1400 may continuously deposit infill within collection bins in operation.

Figure 15:
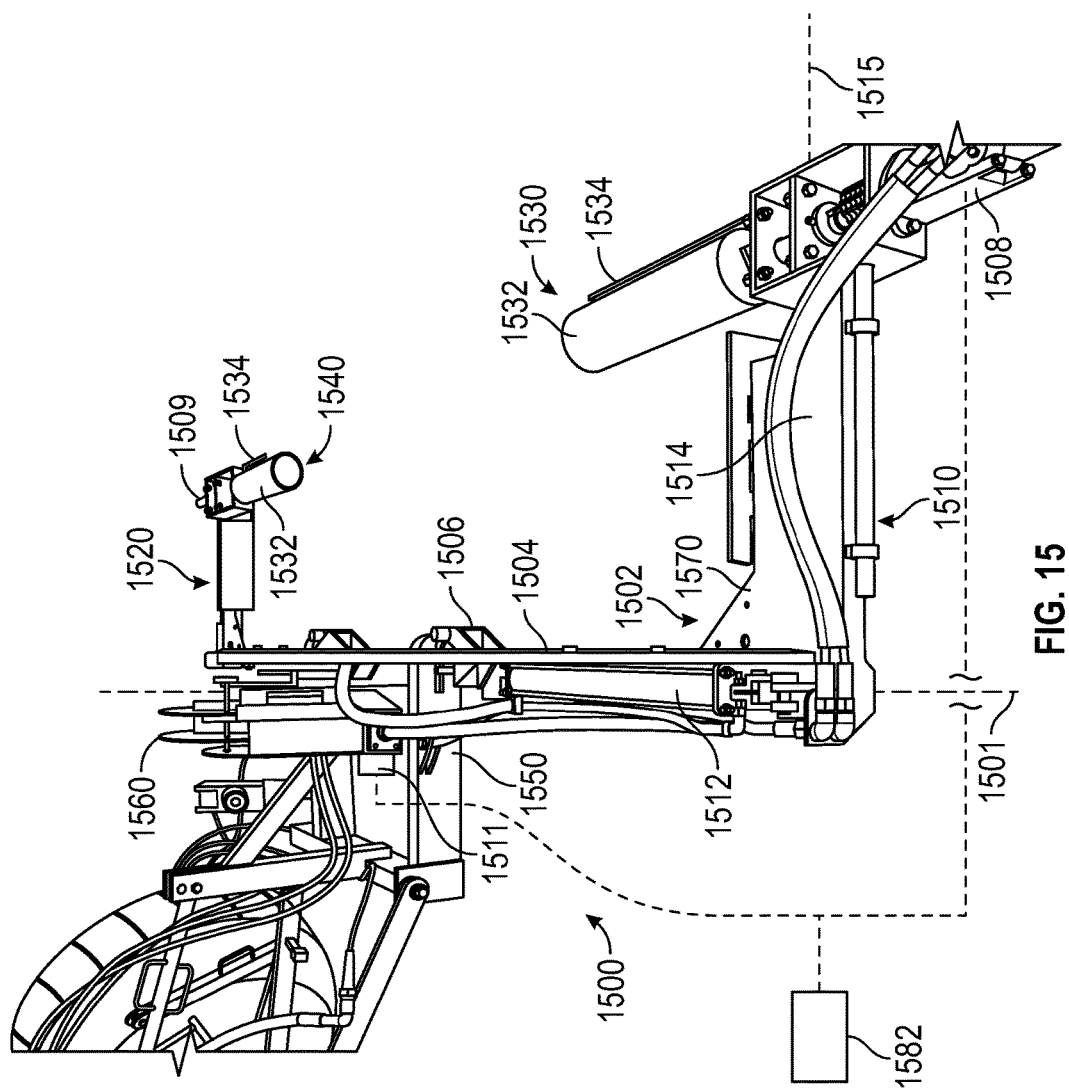
FIG. 15 illustrates a side view of a turf collection machine, in accordance with a representative embodiment.

FIG. 15 illustrates a side view of a turf collection machine, in accordance with a representative embodiment. Specifically, the figure shows a turf collection machine 1500, i.e., a machine for collecting lengths of artificial turf, e.g., by engaging with a length or strip of artificial turf and "rolling up" or otherwise gathering the length of artificial turf for collection, transport, recycling, disposal, cleaning, or otherwise. The length of artificial turf may have already had infill removed from the turf, e.g., using an infill extraction machine as described above.

The turf collection machine 1500 may include a frame 1502 comprising a rear shaft 1504, a first arm 1510, and a second arm 1520. The machine 1500 may further include a first collector 1530 disposed on the first arm 1510 and a second collector 1540 disposed on the second arm 1520, e.g., for collecting a length of artificial turf.

The first arm 1510 and the second arm 1520 may be engaged with the rear shaft 1504, where the second arm 1520 is disposed opposite the first arm 1510. The engagement of one or more of the first arm 1510 and the second arm 1520 with the rear shaft 1504 may include one or more of a hinged engagement (e.g., via a hinge 1506 or the like) and an engagement that promotes linear movement of one or more of the first arm 1510 and the second arm 1520 relative to the rear shaft 1504, e.g., translation of the first arm 1510 and the second arm 1520 along the rear shaft 1504. For example, in an implementation, one or more of the first arm 1510 and the second arm 1520 include shafts that are inserted into a cavity disposed within the rear shaft 1504, where one or more of the first arm 1510 and the second arm 1520 are configured to slide linearly within the cavity to change a size or shape of the frame 1502. In other implementations, one or more of the first arm 1510 and the second arm 1520 can slide linearly along the rear shaft 1504 to change a size or shape of the frame 1302, e.g., using rails, racks, sliders, or the like. In other words, in embodiments, the first arm 1510 and the second arm 1520 may be structurally configured to move along a longitudinal axis 1501 of the rear shaft 1504 of the frame 1502.

One or more of the first arm 1510 and the second arm 1520 may also or instead be engaged to the rear shaft 1504 via the hinge 1506, such that one or more of the first arm 1510 and the second arm 1520 can fold inward to a stowed position, e.g., for transport. To this end, each of the first arm 1510 and the second arm 1520 may include such a hinge 1506. The hinge 1506 may also or instead be located substantially centrally along the rear shaft 1504, or in another location along the length of the rear shaft 1504.

The first arm 1510 and the second arm 1520 may be movable between a first position in which the first arm 1510 and the second arm 1520 are disposed a first distance apart from one another along a length of the rear shaft 1504 and a second position in which the first arm 1510 and the second arm 1520 are disposed a second distance apart from one another along the length of the rear shaft 1504. The second distance may be greater than the first distance.

The first position may be a stowed position for the turf collection machine 1500. In other words, the first distance may be a distance between the first arm 1510 and the second arm 1520 that exists when the turf collection machine 1500 or frame 1502 is disposed in a stowed position or a stowed state. For example, in the first position, one or more of the first arm 1510 and the second arm 1520 may be folded inward (e.g., using the hinge 1506 or the like) such that the first arm 1510 and the second arm 1520 are substantially adjacent to one another, are touching, or are linked together.

The first position may also or instead include a position where one or more of the first arm 1510 and the second arm 1520 are slid to a maximum depth along or within the rear shaft 1504, e.g., in an embodiment where one or more of the first arm 1510 and the second arm 1520 can slide linearly along the rear shaft 1504 (e.g., within a cavity of the rear shaft 1504 or otherwise along a length of the rear shaft 1504) to change a size or shape of the frame 1502.

In an implementation, the first distance is less than or equal to about 102 inches.

The second position may be an expanded position for the turf collection machine 1500, e.g., a position that includes a distance between the first arm 1510 and the second arm 1520 sufficient to collect artificial turf. In an implementation, the second distance is greater than or equal to about 120 inches.

As discussed above, the first arm 1510 and the second arm 1520 may be movable on the frame 1502. Movement of the first arm 1510 and the second arm 1520 may include one or more of linear movement (e.g., about the longitudinal axis 1501 of the rear shaft 1304), pivoting or swinging movement (e.g., between a position substantially parallel with the longitudinal axis 1501 of the rear shaft 1304 and a position substantially perpendicular with the longitudinal axis 1501 of the rear shaft 1304), or rotational movement (e.g., about the longitudinal axis 1501 of the rear shaft 1304). For example, in an implementation, each of the first arm 1510 and the second arm 1520 is movable substantially linearly along the length of the rear shaft 1504. The linear movement of each of the first arm 1510 and the second arm 1520 may be provided by one or more linear actuators 1512 or the like. As discussed above, each of the first arm 1510 and the second arm 1520 may be engaged with the rear shaft 1504 by insertion into a cavity of the rear shaft 1504, where linear movement of each of the first arm 1510 and the second arm 1520 is disposed along a longitudinal axis 1501 of the rear shaft 1504.

As discussed above, pivoting or swinging movement may be provided by one or more hinges 1506 or the like disposed on the frame 1502, e.g., the rear shaft 1504 of the frame 1502. In an implementation, each of the first arm 1510 and the second arm 1520 is engaged with the rear shaft 1504 via a hinged connection (e.g., the hinge 1506), where each of the first arm 1510 and the second arm 1520 is movable from the first position to the second position by a swinging movement using the hinged connection.

Each of the first arm 1510 and the second arm 1520 may further include an extension 1514 that is adjustable along an axis 1515 that intersects the longitudinal axis 1501 of the rear shaft 1504 for moving the first collector 1530 and the second collector 1540 relative to the rear shaft 1504. Adjustment of the extension 1514 may be provided by one or more linear actuators or the like.

In an implementation, the first arm 1510 and the second arm 1520 are substantially the same. In another implementation, the first arm 1510 and the second arm 1520 include different components or features, or are sized and shaped differently relative to one another.

The first collector 1530 may be disposed on the first arm 1510 and the second collector 1540 may be disposed on the second arm 1520. The first collector 1530 and the second collector 1540 may be rotatable on the frame 1302, e.g., independently from one another. In another implementation, the first collector 1530 and the second collector 1540 rotate together or otherwise in a coordinated manner. Rotation of the first collector 1530 and the second collector 1540 may be controlled by a controller or the like, such as any as described herein.

The first collector 1530 and the second collector 1540 may each include a turf roller 1532 and a stabilizing finger 1534. This configuration may provide for increased strength and stability compared to other collectors, e.g., collectors that include a plurality of fingers (e.g., as shown in FIG. 16).

The turf roller 1532 may be structurally configured for artificial turf to be wrapped about a body of the turf roller 1532 when one or more of the first collector 1530 and the second collector 1540 are rotated and artificial turf is engaged with one or more of the first collector 1530 and the second collector 1540. The turf roller 1532 may include a substantially cylindrical tube, e.g., the body of the turf roller 1532 may be sized and shaped as a substantially cylindrical tube or pipe. The turf roller 1532 may include a diameter that is greater than about three inches, e.g., the substantially cylindrical tube may comprise a diameter that is greater than about three inches.

The stabilizing finger 1534 may be structurally configured for artificial turf to be folded about a body of the stabilizing finger 1534 for engagement of the artificial turf with the turf roller 1532. The stabilizing finger 1534 may also or instead be positioned on the first collector 1530 and the second collector 1540 for lifting artificial turf for collection. In an implementation, the stabilizing finger 1534 includes a tip having a tapered shape, which can assist the stabilizing finger 1534 to position itself below a length of artificial turf. The stabilizing finger 1534 may be aligned substantially parallel to the turf roller 1532. The stabilizing finger 1534 may also or instead be attached to an exterior of the turf roller 1532.

Figure 16:
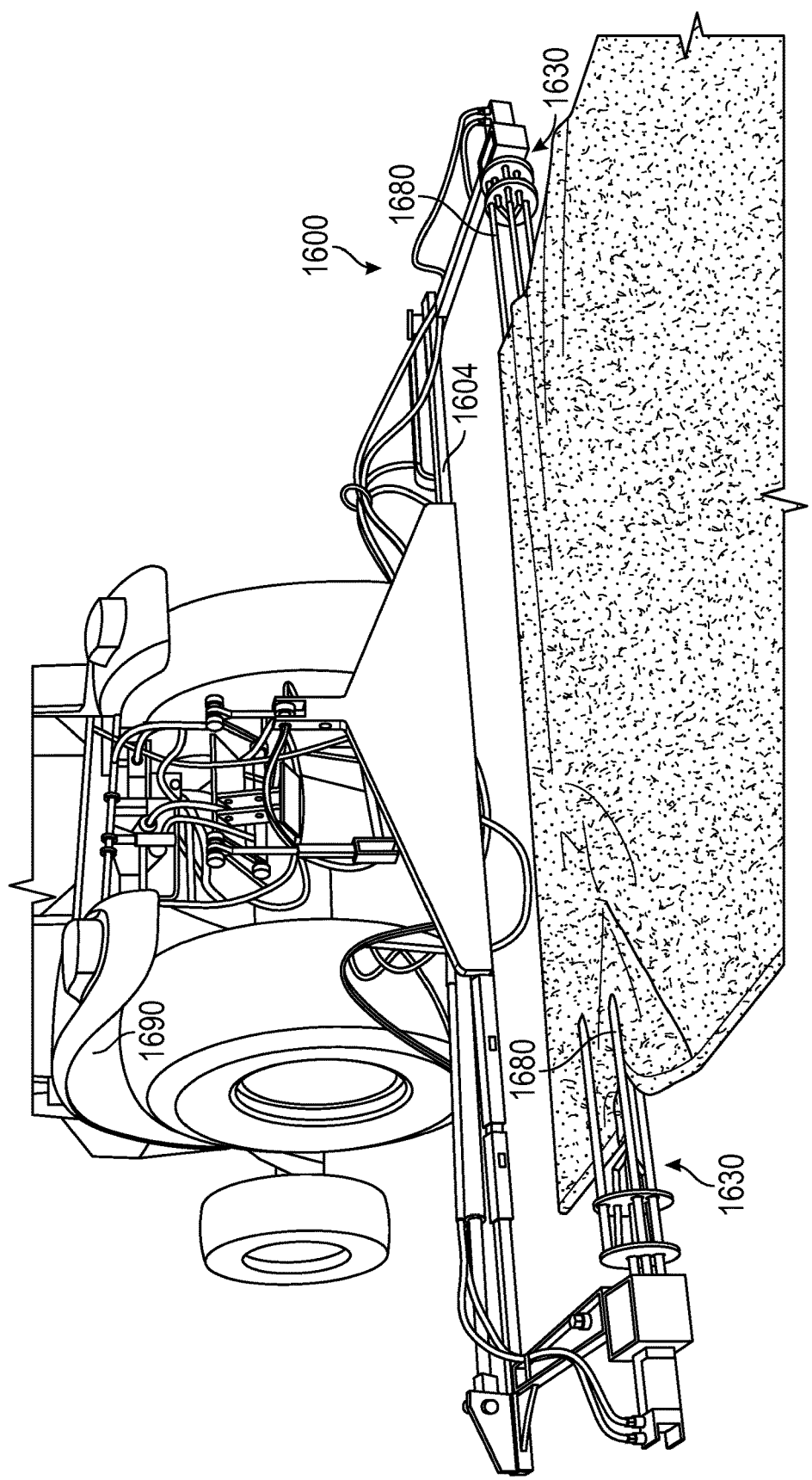
FIG. 16 illustrates a front perspective view of a turf collection machine, in accordance with a representative embodiment.

One or more of the first collector 1530 and the second collector 1540 may also or instead include a plurality of fingers (e.g., as shown in FIG. 16).

In an implementation, the first collector 1530 and the second collector 1540 are substantially the same. In another implementation, the first collector 1530 and the second collector 1540 include different components or features, or are sized and shaped differently relative to one another.

The turf collection machine 1500 may further include one or more motors or the like, e.g., for moving or driving one or more of its components. For example, the turf collection machine 1500 may include a first motor 1508 for driving rotation of one or more of the first collector 1530 and the second collector 1540. The turf collection machine 1500 may also or instead include a second motor 1509 to drive movement of one or more of the first arm 1510 and the second arm 1520, e.g., between the first position and the second position. In an implementation, the first motor 1508 and the second motor 1509 are the same motor. In another implementation, the first motor 1508 and the second motor 1509 are separate motors. The turf collection machine 1500 may further include a third motor 1511 for adjusting the extension 1514 of one or more of the first arm 1510 and the second arm 1520.

The turf collection machine 1500 may also include a bracket 1570 for engagement of each of the first arm 1510 and the second arm 1520 with the rear shaft 1504, where the bracket 1570 is structurally configured to provide structural stability for the frame 1502. The bracket 1570 may be collapsible, allowing the first arm 1510 and the second arm 1520 to collapse upon the rear shaft 1504 such that the turf collection machine 1500 is disposed in a stowed position.

The turf collection machine 1500 may further include a reel 1560 for winding cabling or the like (e.g., hydraulic lines), where the cabling is attached to one or more motors, linear actuators, or the like.

The frame 1502 may include a coupling 1550 or the like that is structurally configured for engagement with a vehicle, e.g., for towing or propelling the turf collection machine 1500.

The turf collection machine 1500 may include a roller motor (e.g., the first motor 1508 and the second motor 1509) in communication with one or more of the first collector 1530 and the second collector 1540. In an implementation, the turf collection machine 1500 includes a roller motor for each of the first collector 1530 and the second collector 1540. The roller motor may be in communication with one or more of the first collector 1530 and the second collector 1540 for driving rotation of one or more of the first collector 1530 and the second collector 1540. An operator may utilize a controller 1582, such as any as described herein, for controlling operation of the turf collection machine 1500 and its components, e.g., one or more of the first collector 1530 and the second collector 1540, e.g., through control of the roller motor.

FIG. 16 illustrates a front perspective view of a turf collection machine, in accordance with a representative embodiment. The turf collection machine 1600 shown in FIG. 16 may be similar to that described with reference to FIG. 15, but the turf collection machine 1600 includes a plurality of fingers 1680 on the collectors 1630 instead of a turf roller. The turf collection machine 1600 may also lack a hinge or the like on the rear shaft 1604. As shown in FIG. 16, the turf collection machine 1600 may be driven, e.g., pulled, by a tractor 1690 or the like.

Figure 17:
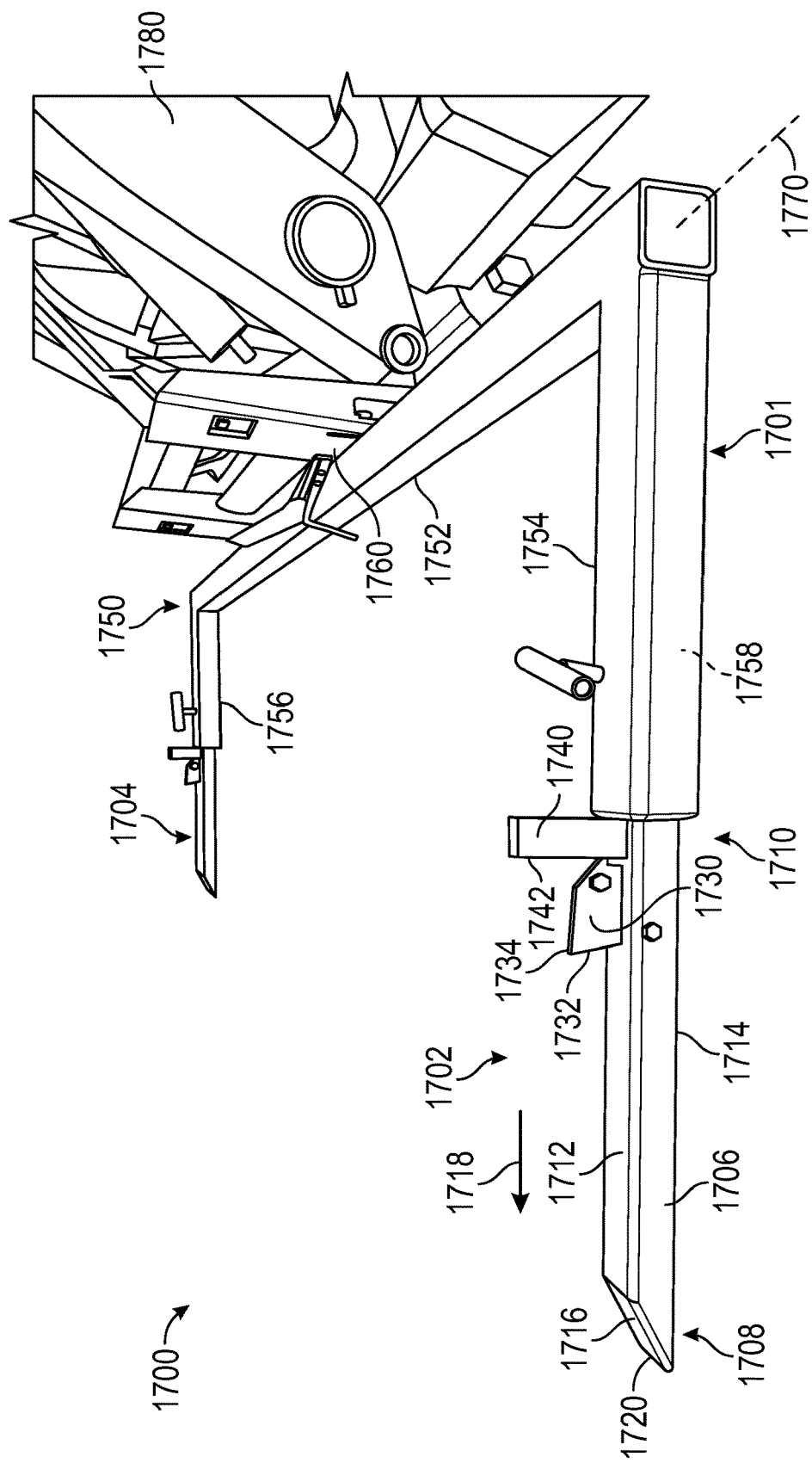
FIG. 17 illustrates a side perspective views of a system for cutting artificial turf, in accordance with a representative embodiment.
Figure 18:
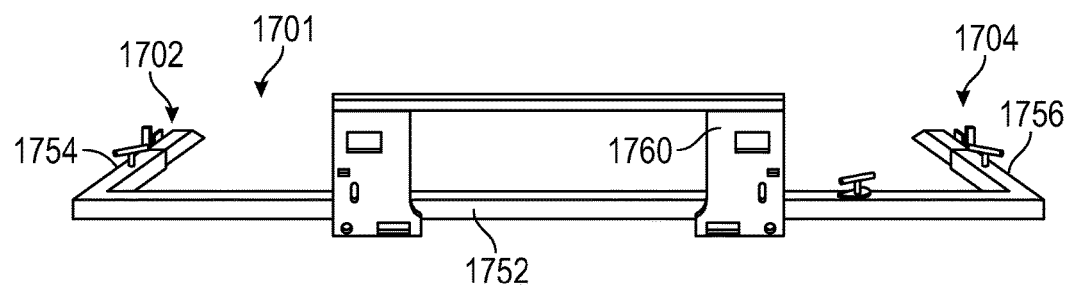
FIG. 18 illustrates a rear view of an apparatus for cutting artificial turf, in accordance with a representative embodiment.
Figure 19:
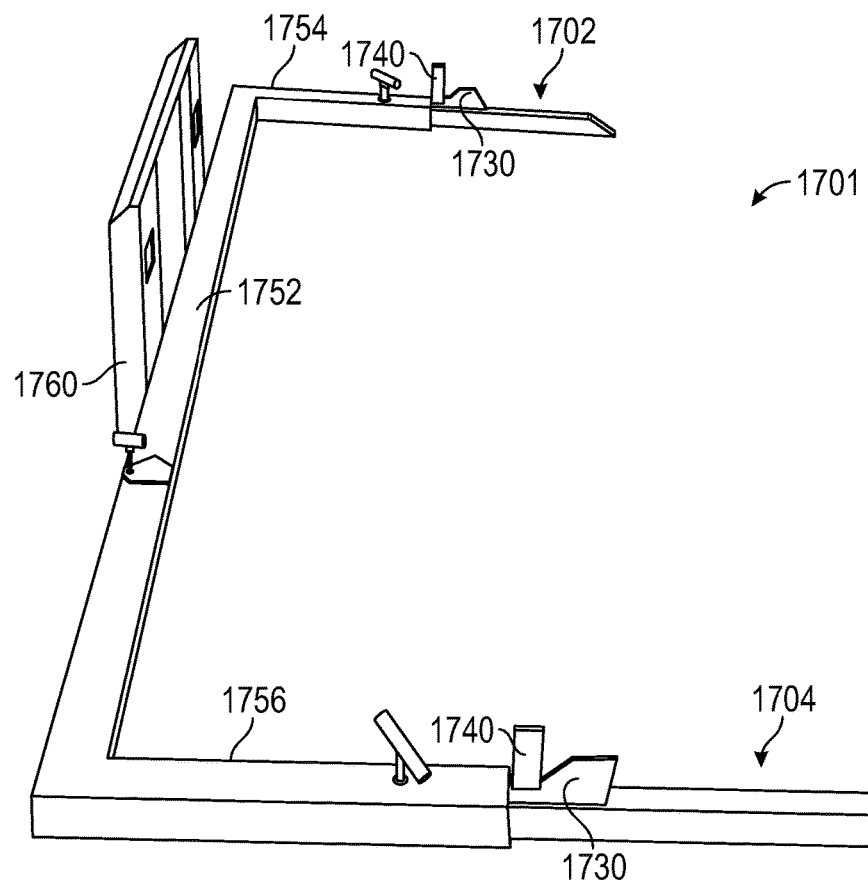
FIG. 19 illustrates a top side perspective view of a system for cutting artificial turf, in accordance with a representative embodiment.

FIG. 17 illustrates a side perspective views of a system for cutting artificial turf, in accordance with a representative embodiment. FIG. 18 illustrates a rear view of an apparatus for cutting artificial turf, in accordance with a representative embodiment. FIG. 19 illustrates a top side perspective view of a system for cutting artificial turf, in accordance with a representative embodiment. Thus, FIG. 17 shows a system 1700 for cutting artificial turf, and FIGS. 18 and 19 show different views of a cutting apparatus 1701 that may be featured in the system 1700 of FIG. 17.

The system 1700 may be configured for cutting an artificial turf field into strips to facilitate its removal. As discussed herein, the artificial turf may be removed by the system 1700 from any padding or other layers disposed beneath the artificial turf without causing any damage to (or minimizing damage to) any such layers. The turf may also or instead be removed by the system 1700 such that the resulting strips of turf have substantially straight edges along cuts. The system 1700 may also or instead be configured for cutting the artificial turf in a manner that can facilitate its reuse, e.g., cutting the artificial turf into strips having a predetermined width selected for reuse.

As opposed to many systems of the prior art, the system 1700 may cut the artificial turf from below, e.g., between a layer of artificial turf and a base layer disposed beneath the layer of artificial turf.

The system 1700 may include one or more devices for cutting artificial turf, e.g., cutting devices. More specifically, and as shown in FIG. 17, the system 1700 may include a first cutting device 1702 and a second cutting device 1704. In an implementation, each of the first cutting device 1702 and the second cutting device 1704 is substantially the same. In another implementation, the first cutting device 1702 and the second cutting device 1704 are different.

The one or more devices for cutting artificial turf may include an elongated body 1706 having a first end 1708, a second end 1710, a top surface 1712, and a bottom surface 1714. The first end 1708 may be the front end of the cutting device, and the second end 1710 may be the back end of the cutting device. The elongated body 1706 may be made of a metal, e.g., steel. The elongated body 1706 may be one piece, e.g., formed from one piece of material or multiple pieces of material that are permanently connected together.

The first end 1708 of the cutting device may be structurally configured for both (i) separating a layer of artificial turf from a base layer disposed beneath the layer of artificial turf and (ii) directing the layer of artificial turf onto the top surface 1712 of the elongated body 1706 for cutting, e.g., when the cutting device is moved in a cutting direction beneath the layer of artificial turf (the cutting direction is shown by arrow 1718 in the figure). To this end, the cutting device may include an inclined surface 1716 formed between the bottom surface 1714 and the top surface 1712 on at least the first end 1708 of the elongated body 1706. The inclined surface 1712 may thus be structurally configured for separating the layer of artificial turf from the base layer and directing the layer of artificial turf onto the top surface 1712 of the elongated body 1706 when the cutting device is moved in a cutting direction beneath the layer of artificial turf.

The inclined surface 1716 may include a front edge 1720 that is substantially flat as shown in the figure. A substantially flat, blunt, or substantially squared front edge 1720 may aid in separating the layer of artificial turf from the base layer, acting as a spatula-like or wedge-like component for separating the layers. Also, a substantially flat, blunt, or substantially squared front edge 1720 may prevent the cutting device from puncturing through a layer of artificial turf or a base layer. In an alternate embodiment, a front edge of the inclined surface is tapered, e.g., coming to a point.

The base layer disposed beneath the layer of artificial turf may include without limitation one or more of padding, a leveling layer, a drainage layer, and the like. The base layer disposed beneath the layer of artificial turf may also or instead include a ground surface (e.g., dirt, grass, pavement, gravel, and the like) disposed underneath of the layer of artificial turf.

The one or more devices for cutting artificial turf may include one or more cutters. Specifically, in an implementation, the cutting device may include a first cutter 1730 and a second cutter 1740. The one or more cutters may generally be configured to cut the layer of artificial turf into strips, e.g., strips between about 3 feet through about 10 feet in width. The one or more cutters may also be configured to cut the layer of artificial turf in substantially straight lines, thereby facilitating its reuse.

The first cutter 1730 may be disposed upstream from the first end 1708 (e.g., where 'upstream' is the direction from the first end 1708 toward the second end 1710 of the cutting device) on the top surface 1712 of the elongated body 1706 between the first end 1708 and the second end 1710. The first cutter 1730 may be disposed closer to the second end 1710 of the elongated body 1706 than the first end 1708. In another implementation, the first cutter 1730 is disposed substantially centrally along the length of the elongated body 1706. In yet another implementation, the first cutter 1730 is disposed closer to the first end 1708 of the elongated body 1706 than the second end 1710 of the elongated body 1706. The first cutter 1730 may be disposed relatively near (e.g., adjacent to) the second cutter 1740 as shown in the figure.

The first cutter 1730 may include a first cutting edge 1732 facing the first end 1708 of the elongated body 1706. The first cutting edge 1732 may be the only cutting edge on the first cutter 1730, or the first cutting edge 1732 may be one of a plurality of cutting edges on the first cutter 1730.

The first cutter 1730 may include a second cutting edge 1734 on a top portion thereof. The second cutting edge 1734 may be the only cutting edge on the first cutter 1730, or the second cutting edge 1734 may be one of a plurality of cutting edges on the first cutter 1730. In an implementation, the first cutter 1730 includes both the first cutting edge 1732 and the second cutting edge 1734 as shown in the figure. More cutting edges are also possible.

One or more of the first cutting edge 1732 and the second cutting edge 1734 may include a plurality of serrations or the like. One or more of the first cutting edge 1732 and the second cutting edge 1734 may instead be entirely without serrations.

In an implementation, the first cutter 1730 is removably attached to the elongated body 1706. The first cutter 1730 may be removably attached to the elongated body 1706 to provide for ease in cleaning, sharpening, repairing, or replacing the first cutter 1730. To facilitate a removable engagement with the elongated body 1706, the first cutter 1730 may include one or more holes for cooperating with pins, bolts, or the like engaged with the elongated body 1730. The first cutter 1730 may also or instead be removably attached to the elongated body 1706 via other means such as a friction fit, a snap connection, a clamp, a clip, a latch, a screw, and combinations thereof.

In another implementation, the first cutter 1730 is permanently attached to the elongated body 1706, e.g., it is integral with the elongated body 1706. For example, the first cutter 1730 may be welded in place on the elongated body 1706.

The first cutter 1730 may be substantially stationary relative to the elongated body 1706 when cutting the layer of artificial turf. In other words, the first cutter 1730 may not move, or contain any moving parts, relative to the elongated body 1706 or other parts of the system 1700. In this manner, the first cutter 1730 may differ from rotary blades and the like of the prior art that cut the artificial turf from above. Cutting the layer of artificial turf from below may cause less damage to any padding or matting included underneath the layer of artificial turf.

As stated above, the cutting device may include second cutter 1740. The second cutter 1740 may be disposed upstream from the first cutter 1730 (e.g., where 'upstream' is the direction toward the second end 1710 of the cutting device) on the top surface 1712 of the elongated body 1706 between the first end 1708 and the second end 1710.

The second cutter 1740 may include a separating edge 1742 facing the first end 1708 of the elongated body 1706. The second cutter 1740 may be structurally configured for cutting portions of the layer of artificial turf not cut by the first cutter 1730. More specifically, the separating edge 1742 of the second cutter 1740 may be structurally configured for cutting portions of the layer of artificial turf not cut by the first cutter 1730. To this end, the separating edge 1742 of the second cutter 1740 may not need to be relatively sharp. In other words, in an implementation, the separating edge 1742 of the second cutter 1740 may be substantially blunt relative to the first cutting edge 1732 of the first cutter 1730.

The second cutter 1740 may be taller than the first cutter 1730, i.e., as measured from the top surface 1712 of the elongated body 1706. This may be because the second cutter 1740 is configured for cutting portions of the layer of artificial turf not cut by the first cutter 1730 because these portions of the artificial turf may have 'jumped' over the cutting edges of the first cutter 1730. Additionally, and as described in more detail below, the cutting devices may be configured for engaging with a frame 1750 in implementations. In one such implementation, the second cutter 1740 may serve as a physical stop for positioning the cutting device for engagement with the frame 1750, e.g., insertion into a cavity of the frame 1750.

The second cutter 1740 may be integral with the elongated body 1706. In an implementation, the second cutter 1740 is an extension of the material of the elongated body 1706. In an implementation, the second cutter 1740 is otherwise permanently engaged with the elongated body 1706, e.g., through welding or the like. In another implementation, the second cutter 1740 is removably attached to the elongated body 1706.

As described herein, the cutting devices may be moved in a cutting direction beneath the layer of artificial turf. In an implementation, the cutting direction is configured to be aligned with a direction of fibers included on the layer of artificial turf. This may facilitate ease in cutting the layer of artificial turf.

The cutting devices described herein, e.g., the first cutting device 1702 and the second cutting device 1704, may be engaged with a frame 1750 as part of the system 1700. The frame 1750 may be the same or similar to any other frames as described herein, e.g., with reference to the turf collection machines described herein.

The frame 1750 may include a rear shaft 1752. The frame 1750 may further include a first arm 1754 and a second arm 1756 engaged with the rear shaft 1750, where the second arm 1756 is disposed opposite from the first arm 1754. The first cutting device 1702 may be disposed on the first arm 1754 and the second cutting device 1704 may be disposed on the second arm 1756. Each of the first cutting device 1702 and the second cutting device 1704 may include an elongated body 1706 having a first end 1708, a second end 1710, a top surface 1712, and a bottom surface 1714. Each of the first cutting device 1702 and the second cutting device 1704 may further include an inclined surface 1716 formed between the bottom surface 1714 and the top surface 1712 on the first end 1708 of the elongated body 1706, where the inclined surface 1716 is structurally configured for separating a layer of artificial turf from a base layer disposed beneath the layer of artificial turf and for directing the layer of artificial turf onto the top surface 1712 of the elongated body 1706 when the first cutting device 1702 and the second cutting device 1704 are moved in a cutting direction beneath the layer of artificial turf. Each of the first cutting device 1702 and the second cutting device 1704 may further include a first cutter 1730 disposed upstream from the inclined surface 1716 on the top surface 1712 of the elongated body 1706 between the first end 1708 and the second end 1710, where the first cutter 1730 comprises a first cutting edge 1732 facing the first end 1708 of the elongated body 1706. Each of the first cutting device 1702 and the second cutting device 1704 may further include a second cutter 1740 disposed upstream from the first cutter 1730 on the top surface 1712 of the elongated body 1706 between the first end 1708 and the second end 1710, where the second cutter 1740 comprises a separating edge 1742 facing the first end 1708 of the elongated body 1706.

In an implementation, the first cutting device 1702 may be removably attached to the first arm 1754 and the second cutting device 1704 may be removably attached to the second arm 1756. Attachment of the cutting devices to the arms of the frame 1750 may be through insertion of the arms into a cavity 1758 in the ends of the arms of the frame 1750. For example, in an implementation, the second end 1710 of each of the first cutting device 1702 and the second cutting device 1704 may be structurally configured for insertion into a cavity 1758 disposed on an end of each of the first arm 1754 and the second arm 1756. Pins or the like may secure the position of the cutting devices on the arms of the frame 1750. Attachment of the cutting devices to the arms of the frame 1750 may also or instead be through any means known in the art, such as friction fits, clamps, screws, and the like.

The first arm 1754 and the second arm 1756 may be movable. For example, the first arm 1754 and the second arm 1756 may be movable between a first position in which the first arm 1754 and the second arm 1756 are disposed a first distance apart from one another along a length of the rear shaft 1752 and a second position in which the first arm 1754 and the second arm 1756 are disposed a second distance apart from one another along the length of the rear shaft 1752, where the second distance is greater than the first distance. In an implementation, the first distance is less than or equal to about 102 inches. In an implementation, the second distance is greater than or equal to about 120 inches.

In an implementation, each of the first arm 1754 and the second arm 1756 is movable substantially linearly along the length of the rear shaft 1752. Linear movement of each of the first arm 1754 and the second arm 1756 may be provided by one or more linear actuators or the like. In an implementation, each of the first arm 1754 and the second arm 1756 is engaged with the rear shaft 1752 by insertion into a cavity of the rear shaft 1752, where linear movement of each of the first arm 1754 and the second arm 1756 is disposed along a longitudinal axis 1770 of the rear shaft 1752.

In an implementation, each of the first arm 1754 and the second arm 1756 is movable via a folding motion, a pivoting motion, or the like. For example, each of the first arm 1754 and the second arm 1756 may be engaged with the rear shaft 1752 via a hinged connection, where each of the first arm 1754 and the second arm 1756 is movable from the first position to the second position by a swinging movement using the hinged connection.

In an implementation, each of the first arm 1754 and the second arm 1756 include an extension or the like that is adjustable along an axis that intersects a longitudinal axis of the rear shaft 1752 for moving the first cutting device 1702 and the second cutting device 1704 relative to the rear shaft 1752. Adjustment of the extension may be provided by one or more linear actuators.

The system 1700 may further include a bracket or the like configured to engage of each of the first arm 1754 and the second arm 1756 with the rear shaft 1752, where the bracket is structurally configured to provide structural stability for the frame 1750.

The frame 1750 may further include a coupling 1760 structurally configured for engagement with a vehicle 1780 for towing or propelling the system 1700.

As referenced above, devices and machines described herein may be part of a system for removing, recycling, and reusing artificial turf and its infill. The system may include without limitation one or more of the following: (i) a cutter for cutting artificial turf such as those described above; (ii) a machine such as those described above for extracting infill from artificial turf; (iii) a collection system for infill extracted from artificial turf such as the subsystems described above; (iv) a machine for collecting lengths of artificial turf in which the infill has been removed such as those described above; (v) a machine for collecting lengths of artificial turf with infill; (vi) a grading machine; (vii) a device for finishing a field of artificial turf with infill; and (viii) a device for grooming artificial turf, e.g., grooming repairs in artificial turf so that they appear seamless or otherwise uniform with the remainder of the artificial turf.

An implementation may include a machine for extracting infill from artificial turf, including: a first conveyor forming an inclined surface between a first end of the machine and a second end of the machine, the first conveyor including one or more tracks movable along the inclined surface from the first end of the machine to the second end of the machine, the one or more tracks structurally configured to engage a length of artificial turf and to move the length of artificial turf from the first end of the machine to the second end of the machine. The machine may also include a rake disposed on the first end of the machine and including one or more teeth structurally configured to engage an underside of the length of artificial turf for feeding the length of artificial turf onto the first conveyer. The machine may also include a first roller disposed above the first conveyor, the first roller movable to apply a downward force to a top surface of the first conveyor, the downward force promoting an engagement of the artificial turf and the one or more tracks when the artificial turf is disposed between the first roller and the first conveyor. The machine may also include a second roller disposed on the second end of the machine, the second roller configured to rotatably engage the length of artificial turf being transported by the first conveyor, the second roller including one or more protrusions that agitate the length of artificial turf for assisting in removing infill from the length of artificial turf. The machine may also include a second conveyor disposed beneath the second roller to receive infill removed from the length of artificial turf, the second conveyor including a surface structurally configured to transport the infill for discharge from the machine.

Implementations may include one or more of the following features. The machine where a width of the first conveyor is selected to accommodate engagement with a length of artificial turf having a width of at least about 12 feet. The machine where the second positioner is controllable to move the first roller to disengage from the top surface of the first conveyor when the length of artificial turf remains engaged with the first conveyor without the downward force being applied to the top surface of the first conveyor. The machine where the second positioner is controllable to move the first roller along a length of the first conveyor between the first end of the machine and the second end of the machine. The machine where the one or more tracks of the first conveyor are disposed on one or more chains, where rotation of the one or more chains by a drive gear causes movement of the one or more tracks from the first end of the machine to the second end of the machine. The machine where the inclined surface of the first conveyor includes an angle of about 30 degrees relative to a horizontal axis disposed through the machine. The machine further comprising a depositor engaged with the third conveyor at the second height. The machine further including flaps for directing infill onto the second conveyor. The machine further including a control station comprising the controller. The machine where the one or more wheels comprise continuous tracts. The machine further including one or more receiving areas including a holder structurally configured for engagement with a container for holding infill discharged from the machine, the holder including one or more arms movable from a first position to hold the container in a receiving posture for accepting infill and a second position to release the container. The machine where the one or more receiving areas include at least two receiving areas such that at least one holder is in the first position for accepting infill discharged from the machine while another holder is in the second position for releasing the container with a desired amount of infill.

An implementation may include a machine for collecting lengths of artificial turf having a frame including a rear shaft. The machine may also include a first arm and a second arm engaged with the rear shaft, the second arm disposed opposite the first arm, where the first arm and the second arm are movable between a first position in which the first arm and the second arm are disposed a first distance apart from one another along a length of the rear shaft and a second position in which the first arm and the second arm are disposed a second distance apart from one another along the length of the rear shaft, the second distance being greater than the first distance. The machine may also include a first collector disposed on the first arm and a second collector disposed on the second arm, the first collector and the second collector independently rotatable on the frame. The machine may also include a first motor for driving rotation of one or more of the first collector and the second collector.

Implementations may include one or more of the following features. The machine where the first collector and the second collector each include a turf roller and a stabilizing finger, the turf roller structurally configured for artificial turf to be wrapped about the turf roller when one or more of the first collector and the second collector are rotated and artificial turf is engaged with one or more of the first collector and the second collector, and the stabilizing finger structurally configured for artificial turf to be folded about the stabilizing finger for engagement of the artificial turf with the turf roller. The machine where the turf roller includes a substantially cylindrical tube. The machine where the substantially cylindrical tube includes a diameter that is greater than about 3 inches. The machine where the stabilizing finger is positioned on the first collector and the second collector for lifting up artificial turf for collection. The machine where the stabilizing finger includes a tip having a tapered shape. The machine where the stabilizing finger is aligned substantially parallel to the turf roller. The machine where the stabilizing finger is attached to an exterior of the turf roller. The machine where the first collector and the second collector each include a plurality of fingers. The machine where each of the first arm and the second arm is movable substantially linearly along the length of the rear shaft. The machine where linear movement of each of the first arm and the second arm is provided by one or more linear actuators. The machine where each of the first arm and the second arm is engaged with the rear shaft by insertion into a cavity of the rear shaft, and where linear movement of each of the first arm and the second arm is disposed along a longitudinal axis of the rear shaft. The machine further including a second motor to drive movement of one or more of the first arm and the second arm between the first position and the second position. The machine where the first motor and the second motor are the same motor. The machine where the first motor and the second motor are separate motors. The machine where each of the first arm and the second arm is engaged with the rear shaft via a hinged connection, and where each of the first arm and the second arm is movable from the first position to the second position by a swinging movement using the hinged connection. The machine where the first distance is less than or equal to about 102 inches. The machine where the second distance is greater than or equal to about 120 inches. The machine further including a bracket for engagement of each of the first arm and the second arm with the rear shaft, the bracket structurally configured to provide structural stability for the frame. The machine where each of the first arm and the second arm include an extension that is adjustable along an axis that intersects a longitudinal axis of the rear shaft for moving the first collector and the second collector relative to the rear shaft. The machine where adjustment of the extension is provided by one or more linear actuators. The machine where the frame includes a coupling structurally configured for engagement with a vehicle for towing or propelling the machine. The machine further including a reel for winding cabling attached to one or more motors or linear actuators.

An implementation may include a device for cutting artificial turf, including: an elongated body having a first end, a second end, a top surface, and a bottom surface. The device may also include an inclined surface formed between the bottom surface and the top surface on at least the first end of the elongated body, the inclined surface structurally configured for separating a layer of artificial turf from a base layer disposed beneath the layer of artificial turf and for directing the layer of artificial turf onto the top surface of the elongated body when the device is moved in a cutting direction beneath the layer of artificial turf. The device may also include a first cutter disposed upstream from the first end on the top surface of the elongated body, the first cutter including a first cutting edge facing the first end of the elongated body. The device may also include a second cutter disposed upstream from the first cutter on the top surface of the elongated body, the second cutter including a separating edge facing the first end of the elongated body.

Implementations may include one or more of the following features. The device where the first cutter includes a second cutting edge on a top portion thereof. The device where one or more of the first cutting edge and the second cutting edge includes a plurality of serrations. The device where the first cutter is removably attached to the elongated body. The device where the first cutter is substantially stationary relative to the elongated body when cutting the layer of artificial turf. The device where a front edge of the inclined surface is substantially flat. The device where the separating edge of the second cutter is substantially blunt relative to the first cutting edge of the first cutter. The device where the separating edge of the second cutter is structurally configured for cutting portions of the layer of artificial turf not cut by the first cutter. The device where the second cutter is taller than the first cutter. The device where the second cutter is integral with the elongated body. The device where the cutting direction is configured to be aligned with a direction of fibers included on the layer of artificial turf.

An implementation may include a system for cutting artificial turf having a frame including a rear shaft. The system may also include a first arm and a second arm engaged with the rear shaft, the second arm disposed opposite the first arm; and a first cutting device disposed on the first arm and a second cutting device disposed on the second arm. Each of the first cutting device and the second cutting device may include: an elongated body having a first end, a second end, a top surface, and a bottom surface; an inclined surface formed between the bottom surface and the top surface on at least the first end of the elongated body, the inclined surface structurally configured for separating a layer of artificial turf from a base layer disposed beneath the layer of artificial turf and for directing the layer of artificial turf onto the top surface of the elongated body when the first cutting device and the second cutting device are moved in a cutting direction beneath the layer of artificial turf; a first cutter disposed upstream from the first end on the top surface of the elongated body, the first cutter including a first cutting edge facing the first end of the elongated body; and a second cutter disposed upstream from the first cutter on the top surface of the elongated body, the second cutter including a separating edge facing the first end of the elongated body.

Implementations may include one or more of the following features. The system where the first cutting device is removably attached to the first arm and the second cutting device is removably attached to the second arm. The system where the second end of each of the first cutting device and the second cutting device is structurally configured for insertion into a cavity disposed on an end of each of the first arm and the second arm. The system where the first arm and the second arm are movable between a first position in which the first arm and the second arm are disposed a first distance apart from one another along a length of the rear shaft and a second position in which the first arm and the second arm are disposed a second distance apart from one another along the length of the rear shaft, the second distance being greater than the first distance. The system where each of the first arm and the second arm is movable substantially linearly along the length of the rear shaft. The system where linear movement of each of the first arm and the second arm is provided by one or more linear actuators. The system where each of the first arm and the second arm is engaged with the rear shaft by insertion into a cavity of the rear shaft, and where linear movement of each of the first arm and the second arm is disposed along a longitudinal axis of the rear shaft. The system where each of the first arm and the second arm is engaged with the rear shaft via a hinged connection, and where each of the first arm and the second arm is movable from the first position to the second position by a swinging movement using the hinged connection. The system where the first distance is less than or equal to about 102 inches. The system where the second distance is greater than or equal to about 120 inches. The system where each of the first arm and the second arm include an extension that is adjustable along an axis that intersects a longitudinal axis of the rear shaft for moving the first cutting device and the second cutting device relative to the rear shaft. The system where adjustment of the extension is provided by one or more linear actuators. The system further including a bracket configured to engage each of the first arm and the second arm with the rear shaft, the bracket configured to provide structural stability for the frame. The system where the frame includes a coupling structurally configured for engagement with a vehicle for towing or propelling the system.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another implementation, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another implementation, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y, and Z may include any method of directing or controlling any combination of such other individuals or resources to perform steps X, Y, and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A machine for extracting infill from artificial turf, comprising:
    a first conveyor forming an inclined surface between a first end of the machine and a second end of the machine, the first conveyor comprising one or more tracks movable along the inclined surface from the first end of the machine to the second end of the machine, the one or more tracks structurally configured to engage a length of artificial turf and to move the length of artificial turf from the first end of the machine to the second end of the machine;
    a rake disposed on the first end of the machine and comprising one or more teeth structurally configured to engage an underside of the length of artificial turf for feeding the length of artificial turf onto the first conveyer;
    a first roller disposed above the first conveyor on a front end thereof where artificial turf is fed onto the first conveyor from the rake, the first roller pivotally attached to the machine and movable to apply a downward force to a top surface of the first conveyor, the downward force promoting an engagement of the artificial turf and the one or more tracks when the artificial turf is disposed between the first roller and the first conveyor;
    a second roller disposed on the second end of the machine, the second roller configured to rotatably engage the length of artificial turf being transported by the first conveyor, the second roller comprising one or more protrusions that agitate the length of artificial turf for assisting in removing infill from the length of artificial turf; and
    a second conveyor disposed beneath the second roller to receive infill removed from the length of artificial turf, the second conveyor comprising a surface structurally configured to transport the infill for discharge from the machine.

2. The machine of claim 1, further comprising a first positioner engaged with the rake, the first positioner controllable via a controller to move the rake into engagement with the underside of the length of artificial turf.

3. The machine of claim 2, where the first positioner is controllable to adjust one or more of: (i) a tilt angle of the rake relative to the first end of the machine and (ii) a distance between the one or more teeth and the first conveyor.

4. The machine of claim 1, further comprising a second positioner engaged with the first roller, the second positioner controllable via a controller to move the first roller relative to the first conveyor for adjusting the downward force applied to the top surface of the first conveyor.

5. The machine of claim 1, where the second roller is rotatable independent from movement of each of the one or more tracks of the first conveyor and rotation of the first roller.

6. The machine of claim 1, where the first conveyor forms a continuous track around one or more gears.

7. The machine of claim 1, further comprising a third conveyor in communication with the second conveyor and disposed at an angle along a z-axis relative to the second conveyor, the third conveyor structurally configured to transport infill from a first height located at an interface with the second conveyor to a second height located above the first height along the z-axis.

8. The machine of claim 7, where third conveyor comprises a movable surface for transporting the infill.

9. The machine of claim 7, where the third conveyor comprises a rotatable helical screw disposed within a housing.

10. The machine of claim 7, where the third conveyor comprises a number of container supports structurally configured to engage with a corresponding number of handles disposed on a container for holding infill.

11. The machine of claim 10, where at least one of the number of container supports is positionable between a first position for holding at least one of the number of handles of the container and a second position for releasing the at least one of the number of handles of the container.

12. The machine of claim 1, further comprising a controller configured to control one or more of movement of the one or more tracks of the first conveyor, movement of the rake, movement of the first roller, rotation of the second roller, and movement of the surface of the second conveyor.

13. The machine of claim 1, further comprising one or more wheels for maneuvering the machine, and a motor for driving the one or more wheels.

14. The machine of claim 1, where the second roller is configured to direct the length of artificial turf for discharge from the machine.

15. The machine of claim 1, where the surface of the second conveyor is movable.

16. The machine of claim 1, further comprising a base structurally configured for holding one or more of the first conveyor, the rake, the first roller, the second roller, and the second conveyor, the base rotatable relative to a subframe of the machine via one or more gears.

17. The machine of claim 16, further comprising a motor configured to drive rotation of the base relative to the subframe.

18. The machine of claim 1, further comprising a stabilizer disposed adjacent to the first roller on the first end of the machine, the stabilizer structurally configured to guide or stabilize artificial turf on the first conveyor.

19. A system for extracting infill from artificial turf, comprising:
   a first subsystem for extracting infill from artificial turf, comprising:
      a first conveyor forming an inclined surface between a first end and a second end, the first conveyor comprising one or more tracks movable along the inclined surface from the first end to the second end, the one or more tracks structurally configured to engage a length of artificial turf and to move the length of artificial turf from the first end to the second end;
      a rake disposed on the first end comprising one or more teeth structurally configured to engage an underside of the length of artificial turf for feeding the length of artificial turf onto the first conveyer;
      a first roller disposed above the first conveyor on a front end thereof where artificial turf is fed onto the first conveyor from the rake, the first roller pivotally attached to the first subsystem and movable to apply a downward force to a top surface of the first conveyor, the downward force promoting an engagement of the artificial turf and the one or more tracks when the artificial turf is disposed between the first roller and the first conveyor; and
      a second roller disposed on the second end, the second roller configured to rotatably engage the length of artificial turf being transported by the first conveyor, the second roller comprising one or more protrusions that agitate the length of artificial turf for assisting in removing infill from the length of artificial turf; and
   a second subsystem for collecting infill extracted from the artificial turf, comprising:
      a second conveyor disposed beneath the second roller to receive infill removed from the length of artificial turf, the second conveyor comprising a surface structurally configured to transport the infill for discharge from the first subsystem;
      a third conveyor in communication with the second conveyor and disposed at an angle along a z-axis relative to the second conveyor, the third conveyor structurally configured to transport infill from a first height located at an interface with the second conveyor to a second height located above the first height along the z-axis; and
      a depositor in communication with the third conveyor, the depositor forming a pathway for discharging infill from the system to one or more containers.

20. The system of claim 19, where one or more of a size, a shape, and a position of the depositor is adjustable and controllable.

21. The system of claim 19, where one or more of the third conveyor and the depositor are positionable for alignment with the one or more containers.

22. The system of claim 19, further comprising a stabilizer disposed adjacent to the first roller on the first end of the first subsystem, the stabilizer structurally configured to guide or stabilize artificial turf on the first conveyor.

* * * * *